(12) United States Patent
Kimura et al.

(10) Patent No.: US 9,019,424 B2
(45) Date of Patent: Apr. 28, 2015

(54) IMAGE PICKUP APPARATUS, CONTROL METHOD THEREOF, AND PROGRAM

(75) Inventors: Masafumi Kimura, Kawasaki (JP); Koichi Fukuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/131,229

(22) PCT Filed: Jul. 24, 2012

(86) PCT No.: PCT/JP2012/069276
§ 371 (c)(1),
(2), (4) Date: Jan. 7, 2014

(87) PCT Pub. No.: WO2013/015437
PCT Pub. Date: Jan. 31, 2013

(65) Prior Publication Data
US 2014/0146221 A1    May 29, 2014

(30) Foreign Application Priority Data
Jul. 25, 2011   (JP) .................... 2011-162093

(51) Int. Cl.
*G03B 13/00*     (2006.01)
*H04N 5/232*     (2006.01)
*H04N 5/228*     (2006.01)
(Continued)

(52) U.S. Cl.
CPC ......... *H04N 5/23212* (2013.01); *H04N 5/2254* (2013.01); *G02B 7/34* (2013.01); *G03B 13/36* (2013.01); *G02B 7/285* (2013.01); *G02B 7/36* (2013.01)

(58) Field of Classification Search
USPC ........ 348/222.1, 229.1–230.1, 294–324, 335, 348/343, 345–357; 396/72–83, 124; 250/208.1
See application file for complete search history.

(56) References Cited

U.S. PATENT DOCUMENTS 7,283,737 B2 * 10/2007 Ohmura ........................ 396/111
7,732,744 B2    6/2010 Utagawa
(Continued)

FOREIGN PATENT DOCUMENTS

JP    7-199052 A    8/1995
JP    2007-004471 A    1/2007
(Continued)

OTHER PUBLICATIONS

U.S. Appl. No. 14/279,790, filed May 16, 2014.
(Continued)

*Primary Examiner* — Michael Osinski
(74) *Attorney, Agent, or Firm* — Fitzpatrick, Cella, Harper & Scinto

(57) ABSTRACT

An image pickup apparatus which can perform an AF of a high speed and a high focusing precision by simultaneously realizing a phase difference AF and a contrast AF, decides a range where a contrast evaluation can be performed on the basis of a correspondence relation between each pixel of an image pickup element which is restricted by pupil division means provided for restricting light of an optical image of an object which enters each pixel of the image pickup element to light from a specific exit pupil area of a photographing lens and the specific exit pupil area of the photographing lens, and decides a focus evaluation value of the object in accordance with the decided range from a contrast focus position or a correlation focus position.

9 Claims, 18 Drawing Sheets

(51) Int. Cl.
*G02B 13/16* (2006.01)
*H04N 5/225* (2006.01)
*H01L 27/00* (2006.01)
*G02B 7/34* (2006.01)
*G03B 13/36* (2006.01)
*G02B 7/28* (2006.01)
*G02B 7/36* (2006.01)

(56) References Cited

U.S. PATENT DOCUMENTS

| | | | |
|---|---|---|---|
| 7,873,267 B2 * | 1/2011 | Kusaka | 396/104 |
| 8,094,999 B2 * | 1/2012 | Ohnishi | 396/113 |
| 8,405,760 B2 * | 3/2013 | Yamasaki | 348/349 |
| 8,576,329 B2 * | 11/2013 | Takamiya | 348/350 |
| 8,619,180 B2 | 12/2013 | Kimura | |
| 8,633,992 B2 * | 1/2014 | Tsukada | 348/208.12 |
| 8,634,015 B2 | 1/2014 | Kimura | |
| 8,767,118 B2 * | 7/2014 | Yamasaki | 348/350 |
| 2002/0036257 A1 | 3/2002 | Yamashita et al. | 250/208.1 |
| 2004/0090550 A1 * | 5/2004 | Park | 348/350 |
| 2004/0125229 A1 * | 7/2004 | Aoyama et al. | 348/345 |
| 2005/0001924 A1 * | 1/2005 | Honda | 348/348 |
| 2005/0280735 A1 * | 12/2005 | Nakahara | 348/345 |
| 2007/0102619 A1 * | 5/2007 | Kusaka | 250/201.2 |
| 2007/0154200 A1 * | 7/2007 | Utagawa et al. | 396/111 |
| 2007/0206937 A1 * | 9/2007 | Kusaka | 396/89 |
| 2008/0240701 A1 * | 10/2008 | Kusaka | 396/104 |
| 2008/0302947 A1 * | 12/2008 | Utagawa | 250/201.8 |
| 2009/0135289 A1 * | 5/2009 | Kusaka | 348/345 |
| 2010/0150539 A1 * | 6/2010 | Kusaka | 396/125 |
| 2010/0232776 A1 * | 9/2010 | Ohnishi | 396/104 |
| 2011/0157423 A1 | 6/2011 | Ando et al. | |
| 2011/0205423 A1 * | 8/2011 | Tsukada | 348/345 |
| 2012/0176532 A1 * | 7/2012 | Hara | 348/352 |
| 2012/0321203 A1 * | 12/2012 | Yamashita | 382/224 |
| 2013/0021517 A1 * | 1/2013 | Ui et al. | 348/345 |
| 2013/0113987 A1 | 5/2013 | Fukuda | |
| 2013/0235253 A1 * | 9/2013 | Onuki et al. | 348/349 |
| 2013/0242172 A1 * | 9/2013 | Hamano | 348/349 |
| 2013/0329120 A1 * | 12/2013 | Hiasa et al. | 348/345 |
| 2014/0118610 A1 * | 5/2014 | Ohara | 348/349 |
| 2014/0204241 A1 * | 7/2014 | Ohara | 348/223.1 |

FOREIGN PATENT DOCUMENTS

| | | |
|---|---|---|
| JP | 2009-175279 A | 8/2009 |
| JP | 2009-258610 A | 11/2009 |
| JP | 2011-023812 A | 2/2011 |
| JP | 2011-139282 A | 7/2011 |

OTHER PUBLICATIONS

U.S. Appl. No. 14/263,095, filed Apr. 28, 2014.
U.S. Appl. No. 14/232,419, filed Jan. 13, 2014.

* cited by examiner

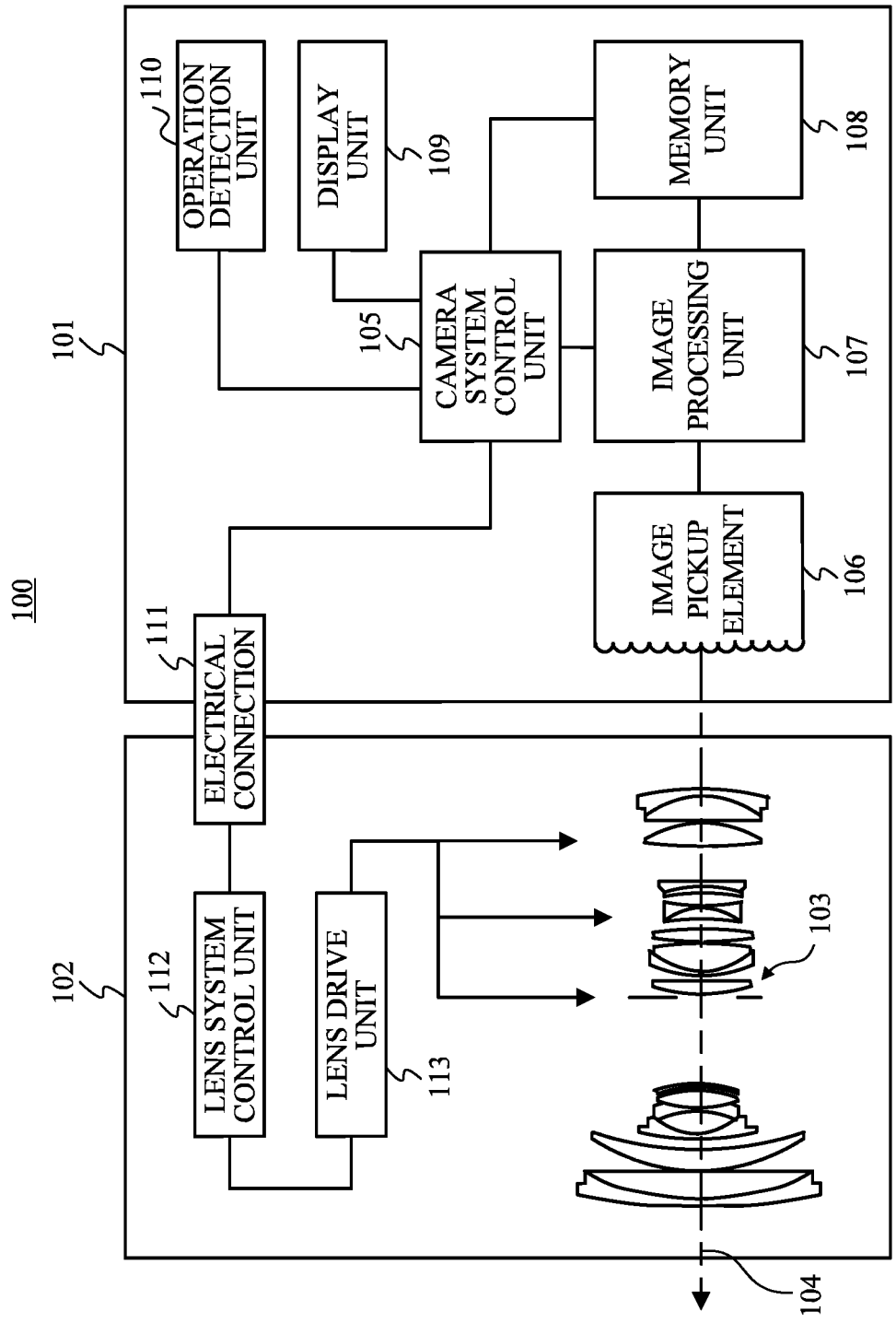

IMAGE PICKUP APPARATUS, CONTROL METHOD THEREOF, AND PROGRAM

TECHNICAL FIELD

The invention relates to an image pickup apparatus having an image pickup element for photoelectrically converting an object image and a control method of such an apparatus and, more particularly, to a control apparatus and method of autofocus (hereinbelow, referred to as AF) based on a photoelectrically-converted signal which is output from the image pickup element.

BACKGROUND ART

In the related art, as autofocus control for a focus adjustment in a digital camera or the like, for example, there are mainly phase difference AF control which is used in a digital single lens reflex camera and contrast AF control which is used in a compact camera or the like. It is a feature of those AF control that, for example, in the phase difference AF, a high-speed focus adjustment can be attained and, in the contrast AF, an exact focus adjustment can be attained.

For example, PTL 1 discloses a method of performing a contrast evaluation on the basis of a signal of a phase difference AF sensor. PTL 2 discloses a method whereby an image pickup element which can individually receive light which passes through different pupil areas is used and an image subjected to the focus adjustment by using an image pickup signal which is output from the image pickup element (that is, after the image pickup processing) is generated.

CITATION LIST

Patent Literature

PTL 1: Japanese Patent Application Laid-Open No. H07-199052
PTL 2: Japanese Patent Application Laid-Open No. 2007-4471

SUMMARY OF INVENTION

Technical Problem

However, according to the related arts disclosed in the above Patent Literatures, there is a case where sufficient focusing precision is not obtained and only an image in which an intended object is not focused is obtained. That is, according to PTL 1, since a sensor for performing a contrast calculation and a sensor for performing an image pickup are different, there is a case where the focusing precision cannot always be improved. According to PTL 2, although an image in which a focus point was changed after the image pickup can be obtained, there is a limitation in a range where a focus can be accurately changed, and when such a range exceeds the limitation, it is difficult to normally obtain the image.

Solution to Problem

The present invention has been made in consideration of the above situation, and it is an object of the invention to provide an image pickup apparatus which can perform an AF of a high speed and a high focusing precision by simultaneously realizing a phase difference AF and a contrast AF on the basis of information of light which entered an image pickup element and passed through different pupil areas.

According to the present invention, an image pickup apparatus including a photographing optical system containing a photographing lens and an image pickup element for photoelectrically converting an optical image of an object which enters through the photographing lens and outputting an image signal, comprises: pupil division means for restricting light of the optical image of the object which enters each pixel of the image pickup element, to light from a specific exit pupil area of the photographing lens; image shift means for deciding a shift amount of the image signal corresponding to a predetermined focus evaluation position for every exit pupil area on the basis of a correspondence relation between each pixel of the image pickup element and the specific exit pupil area of the photographing lens, which relation is restricted by the pupil division means; image generation means for generating an image corresponding to the focus evaluation position by executing an arithmetic operation processing based on the shift amount decided by the image shift means to the image signal; contrast evaluation means for calculating an evaluation value of a contrast of the image generated by the image generation means and deciding a contrast focus position on the basis of the contrast evaluation value; correlation calculation means for calculating an evaluation value of a correlation between images corresponding to different exit pupil areas in the generated image and deciding a correlation focus position on the basis of the correlation evaluation value; focus evaluation range decision means for deciding a range of the focus evaluation position where the image shift means can decide the shift amount, on the basis of a structure of the image pickup element and the pupil division means; and focus evaluation means for comparing an absolute value of the range decided by the focus evaluation range decision means and an absolute value of the correlation focus position decided by the correlation calculation means and deciding a focus evaluation value of the object on the basis of the decided correlation focus position and the decided contrast focus position decided in accordance with a result of the comparison.

Advantageous Effects of Invention

According to the invention, since the phase difference AF and the contrast AF are selectively used in accordance with the image pickup position which is decided in accordance with the structure of the image pickup apparatus, the image pickup apparatus which can perform the AF of a high speed and a high precision can be provided.

Further features of the present invention will become apparent from the following description of exemplary embodiments with reference to the attached drawings.

BRIEF DESCRIPTION OF DRAWINGS

FIG. 1 is a block diagram illustrating a system construction of an image pickup apparatus according to an embodiment of the invention.

DESCRIPTION OF EMBODIMENTS

Figure 2A:
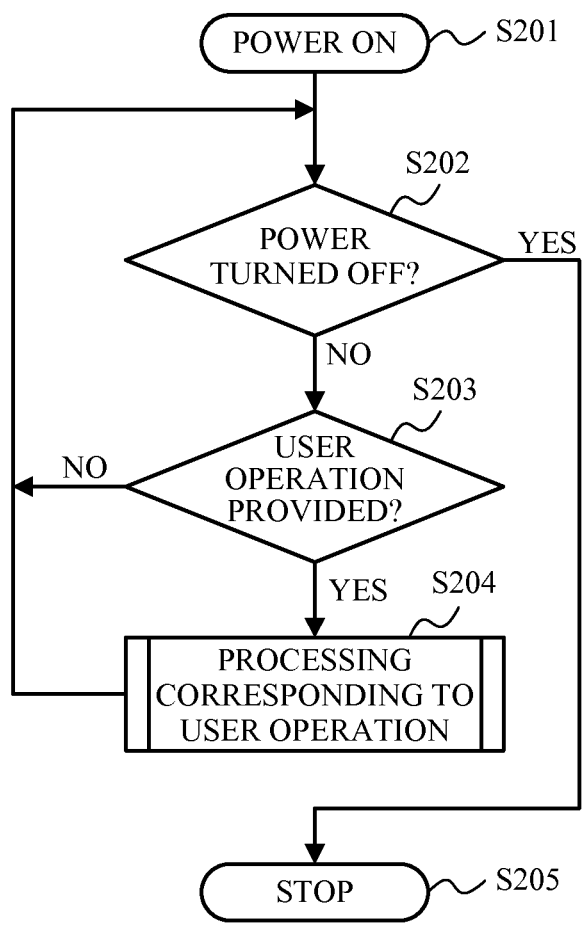
FIGS. 2A, 2B and 2C are diagrams illustrating flowcharts for the image pickup operation according to the first embodiment of the invention.

Preferred embodiments of the present invention will be described in detail in accordance with the accompanying drawings.

EXAMPLE 1

An image pickup apparatus according to the first embodiment of the invention will be described hereinbelow with reference to FIGS. 1 to 7C.

FIG. 1 is a block diagram illustrating a system construction of a digital camera serving as an image pickup apparatus according to the invention. The present camera system has a still image photographing mode and a moving image photographing mode as photographing modes and has a construction in which AF control as an object of the present invention is attained in each photographing mode.

An image pickup apparatus 100 is constructed by a camera 101 and a lens 102 and has an image pickup system, an image processing system, a recording and reproduction system, and a control system. The image pickup system includes a photographing optical system 103 and an image pickup element 106. The image processing system includes an image processing unit 107. The recording and reproduction system includes a memory unit 108 and a display unit 109. The control system includes a camera system control unit 105, an operation detection unit 110, a lens system control unit 112, and a lens drive unit 113. The lens drive unit 113 can drive a focus lens, a blurring correction lens, an iris, and the like.

The image pickup system is an optical processing system for focusing light (optical image) from the object onto an image pickup plane of the image pickup element 106 through the photographing optical system 103 having a photographing lens. Micro lenses are arranged in a matrix form on the surface (photosensing surface) of the image pickup element 106 and what is called a micro lens array (hereinbelow, referred to as MLA) is formed. In the present embodiment, the MLA constructs pupil division means. Although details of a function and a layout of the MLA will be described hereinafter by using FIGS. 3A to 3C, because of the pupil division means, a focus evaluation amount/a proper exposure amount can be obtained from an output signal of the image pickup element 106. Therefore, the photographing optical system 103 is properly adjusted on the basis of such obtained information. Thus, object light of a proper light amount can be exposed to the image pickup element 106 and the object can be focused in the neighborhood of the image pickup element 106.

The image processing unit 107 has therein an A/D converter, a white balance circuit, a gamma correction circuit, an interpolation operation circuit, and the like and can generate an image for recording by an image processing. Image shift means, image generation means, contrast evaluation means, correlation calculation means, and the like serving as a main section of the invention can be also included. In the present embodiment, those elements are constructed as a control program in the camera system control.

The memory unit 108 has not only a storage unit for actually storing data but also a processing unit necessary for recording. The memory unit 108 outputs data to a recording unit and generates and stores an image which is output to the display unit 109. The memory unit 108 also executes a compression processing of the image, a moving image, an audio, or the like by using a predetermined method.

The camera system control unit 105 generates and outputs a timing signal and the like at the time of image pickup and controls each of the image pickup system, the image processing system, and the recording and reproduction system in response to the external operation. For example, the operation detection unit 110 detects a depression of a shutter release button (not shown) and controls the driving (photoelectric conversion) of the image pickup element 106, the operation of the image processing unit 107, a compression processing of the memory unit 108, and the like. Further, a state of each segment of an information display apparatus for displaying information to a liquid crystal monitor or the like is also controlled by the camera system control unit 105 and the display unit 109.

The adjustment operation of the optical system by the control system will be described. The image processing unit 107 is connected to the camera system control unit 105, and a focus position and an iris position which are proper to a photographing condition are obtained on the basis of the image signal from the image pickup element 106. The camera system control unit 105 transmits an instruction to the lens system control unit 112 through an electrical connection 111. The lens system control unit 112 controls the lens drive unit 113 in accordance with the instruction. Further, a vibration detection sensor (not shown) is connected to the lens system control unit 112. In a mode for making a vibration correction, a vibration correction lens is controlled through the lens drive unit 113 on the basis of a signal of the vibration detection sensor.

Figure 2B:
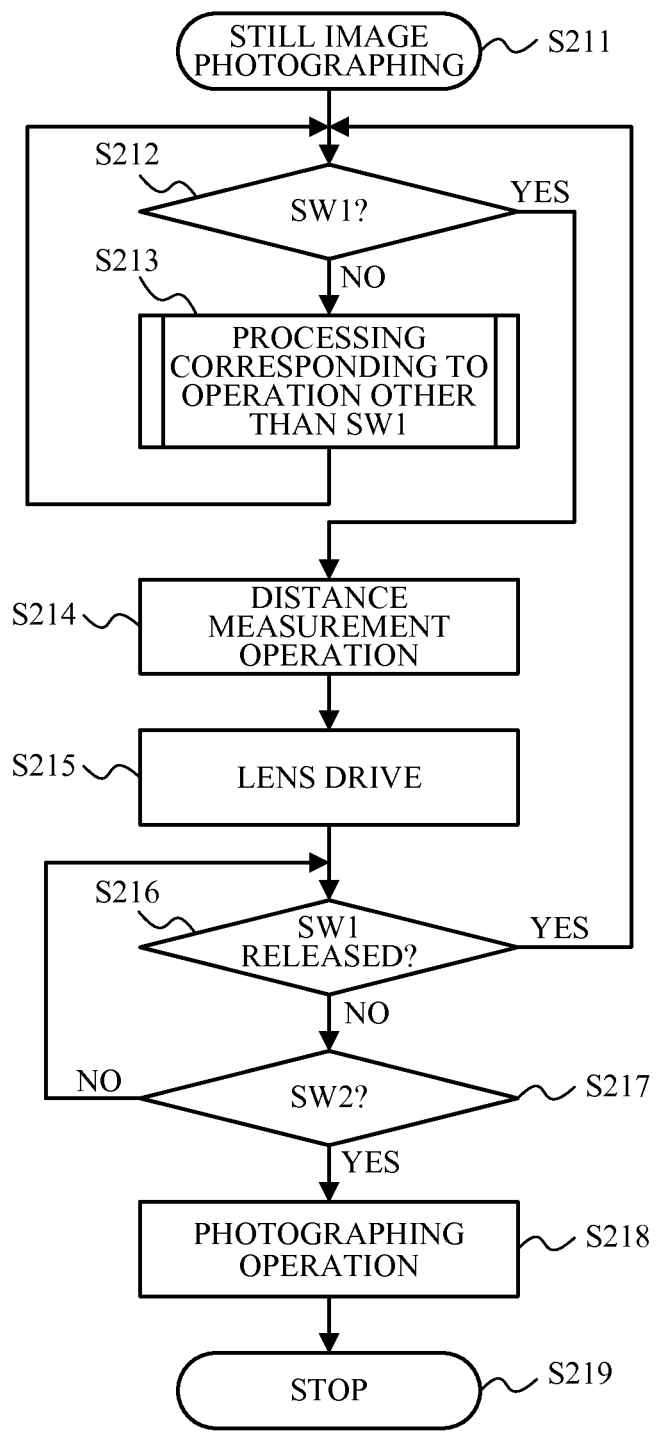
Figure 2C:
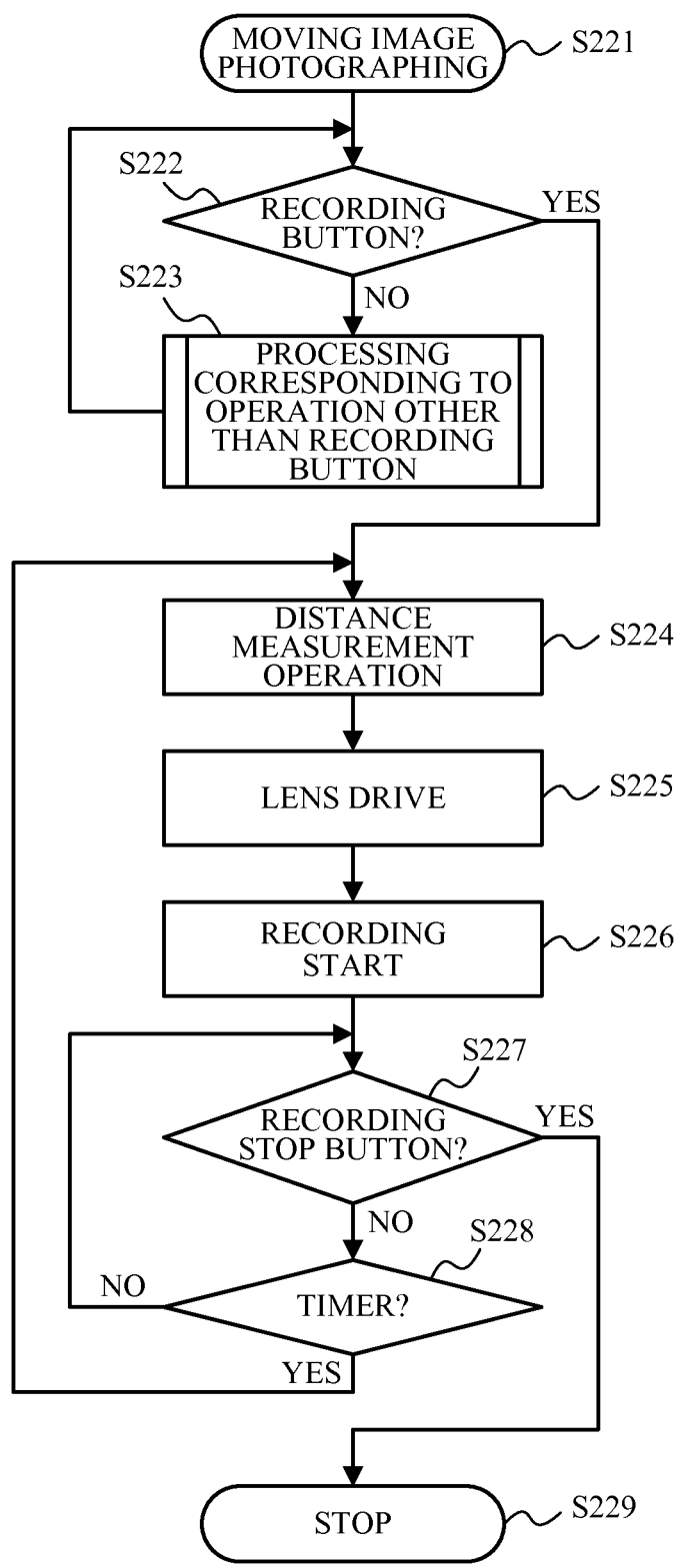

The whole operation of the image pickup apparatus 100 will be described by using FIGS. 2A to 2C. FIGS. 2A to 2C are flowcharts for describing an outline of the operation of the image pickup apparatus of the invention. FIG. 2A illustrates the operation from a power-ON to a power-OFF, FIG. 2B illustrates the operation of a main section of a still image photographing mode, and FIG. 2C illustrates the operation of a main section of a moving image photographing mode, respectively. Those operations are accomplished by a method whereby the camera system control unit 105 loads a control program corresponding to each flowchart from a storage device (not shown) and executes it.

The operation will be described in order of steps starting from FIG. 2A. Step S201 indicates the turn-on of the power source. Step S202 is a step of detecting whether or not the power source is turned off. As for such a detection, a fact that a power switch (not shown), another operation unit (for example, a power button displayed on a menu display screen), or the like of the camera is operated is detected by the operation detection unit 110 in accordance with the control by the camera system control unit 105. When the power-OFF is detected, the processing routine advances to step S205. If not detected, the processing routine advances to step S203. Step S203 is a step of detecting the user operation by the operation detection unit 110 in accordance with the control by the camera system control unit 105. If the image pickup apparatus 100 is operated by the user, step S204 follows. If not, the processing routine is returned to step S202 and the detection of the power-OFF or the user operation is repeated. In step S204, a processing corresponding to the detected user operation is executed. For example, when the selection operation of the still image photographing mode is detected by the operation detection unit 110, the camera system control unit 105 starts the operation of the still image photographing mode. As other operations, there are an execution of the moving image photographing mode, a reproduction of data recorded in the memory means, an operation for changing the setting of the image pickup apparatus 100, and the like.

The operations of the still image photographing mode and the moving image photographing mode as a processing which is executed in step S204 will be described with reference to FIGS. 2B and 2C.

FIG. 2B is a flowchart illustrating the operation of the image pickup apparatus 100 at the time of executing the still image photographing mode. Step S211 indicates the start of the still image photographing mode.

Step S212 is a step in which in accordance with the control by the camera system control unit 105, the operation detection unit 110 discriminates whether or not a first stroke switch (hereinbelow, referred to as SW1) of a release button (not shown) is turned on. In the still image photographing, the photographing operation or photographing preparation operation is executed in accordance with depression of the release button. Generally, the release button is a switch of two strokes. The photographing preparation operation is executed by the turn-on of the first stroke switch and the photographing operation is executed by the turn-on of a second stroke switch. The photographing preparation operation denotes the operation for deciding an AF adjustment of the photographing optical system 103 and an exposure condition of the image pickup element 106 by executing a photometry, a distance measurement, and the like.

If the turn-on of SW1 is detected in step S212, the processing routine advances to step S214 and, if it is not detected, the processing routine advances to step S213. In step S213, a processing according to the operation other than SW1 is executed. While such an operation can be a change in photographing setting and the like, for example, since they are not concerned with the features of the invention, their description is omitted here.

In step S214, the distance measurement as a photographing preparation operation is executed. Although other photographing preparation operations are also simultaneously executed, since they are not the features of the invention, the distance measurement operation and only the operations associated therewith are shown in order to simplify the description.

In step S215, a lens driving for adjustment of the photographing optical system 103 is performed on the basis of a result of step S214, if necessary. If it is determined as a result of step S214 that an in-focus state is currently attained, there is no need to perform the lens driving for adjustment of a focal point.

In step S216, a release of SW1 is monitored. If it is determined that the user releases SW1, the processing routine is returned to step S212 and the apparatus is returned to a detection standby state of the turn-on of SW1. If the user continues the operation of SW1, step S217 follows.

In step S217, the operation detection unit 110 detects the turn-on of the second stroke switch (hereinbelow, referred to as SW2) of the release button in accordance with the control of the camera system control unit 105. If the turn-on of SW2 is detected, the processing routine is returned to step S218. If it is not detected, the processing routine is returned to step S216.

In step S218, the photographing operation is executed. The image pickup element 106 is properly exposed in accordance with the result of the photographing preparation operation. An optical image of the object is obtained as an electric signal and processed by the image processing unit 107. After that, it is recorded into the memory unit 108.

Step S219 indicates a stop of the still image photographing.

As described in FIG. 2B, in the still image photographing mode, the distance measurement and the adjustment operation of the optical system corresponding to steps S212, S214, and S215 are executed in association with the turn-on of SW1. Although the preparation operations are not always limited to those described above with respect to them in a distance measurement and an adjustment method of the optical system called servo AF and continuous AF, the fundamental operation in the still image photographing is shown as an example here.

FIG. 2C is a flowchart illustrating the operation of the image pickup apparatus 100 at the time of performing the moving image photographing. Step S221 indicates the start of the moving image photographing mode.

In step S222, a turn-on of a recording button (not shown) (button which denotes the start of the moving image photographing) is detected by the operation detection unit 110. If the turn-on of the recording button is detected in step S222, step S224 follows. If it is not detected, step S223 follows.

In step S223, a processing corresponding to an operation other than the operation of the recording button is executed. For example, although a change in photographing setting or the like can be mentioned, since it is not the features of the invention, its description is omitted.

In step S224, the distance measurement as a photographing preparation operation is executed. Although other photographing preparation operations are also simultaneously executed, since they are not the features of the invention, the distance measurement operation and only the operations associated therewith are shown in order to simplify the description.

In step S225, the lens driving for adjustment of the photographing optical system 103 is performed on the basis of a result of step S224, if necessary. If it is determined as a result of step S224 that the in-focus state is currently attained, there is no need to perform the lens driving for adjustment of a focal point. By adjusting the optical system before the recording start in steps S224 and S225, a focusing state and the like just after the recording start are properly decided and quality of a video image which is obtained is improved.

In step S226, the recording is started. Specifically speaking, the image signal is read out from the image pickup element 106 at a predetermined sampling interval and subjected to an encode processing and the like by the image processing unit 107. After that, the operation for recording into the memory unit 108 is started.

In step S227, the operation of a recording stop button is detected by the operation detection unit 110. If the operation of the recording stop button is detected in step S227, step S229 follows. If it is not detected, step S228 follows.

In step S228, a measurement time of a timer for performing the distance measurement is discriminated. The processing routine advances to step S224 at every predetermined interval in accordance with the measurement time of the timer. In other cases, the processing routine is returned to step S227 and the apparatus waits for the operation of the recording stop button. By discriminating the measurement time of the timer in step S228, the distance measurement operation in S224 of every predetermined time is executed and the distance measurement and the adjustment of the optical system are also executed during the recording. Step S229 indicates the stop of the moving image photographing.

As described in FIG. 2C, in the moving image photographing, the distance measurement and the adjustment operation of the optical system corresponding to steps S122, S124, S125, and S128 are executed in association with the operation of the recording button and the time measurement of the timer.

Figure 3A:
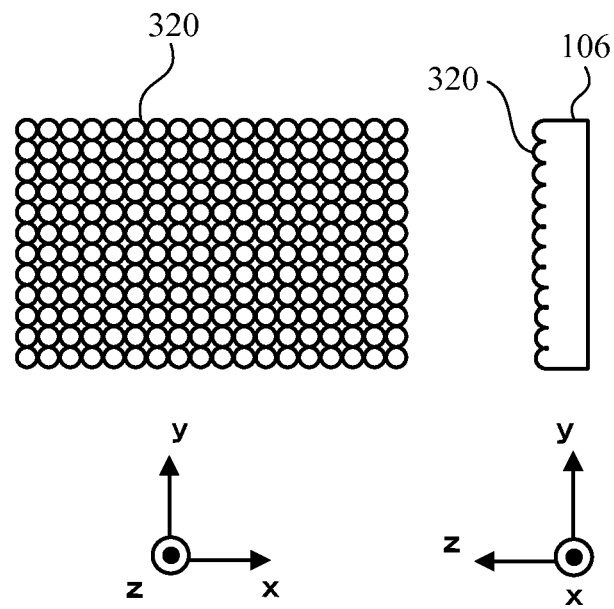
FIGS. 3A, 3B and 3C are conceptual diagrams of an optical system of the photographing apparatus according to the first embodiment of the invention.
Figure 3B:
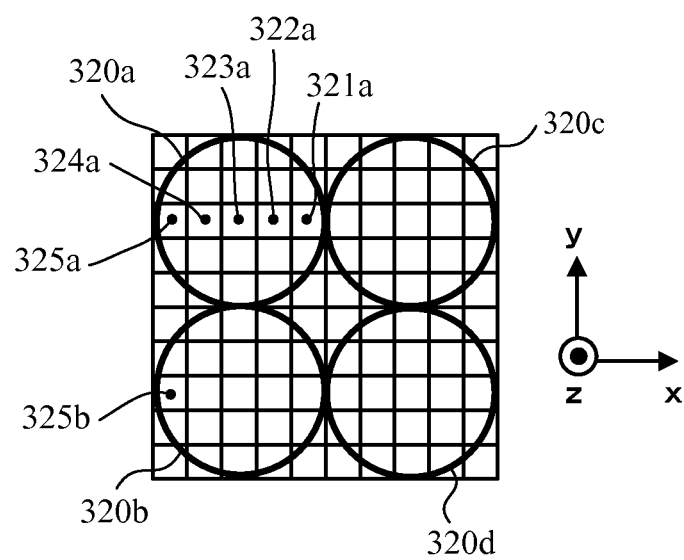
Figure 3C:
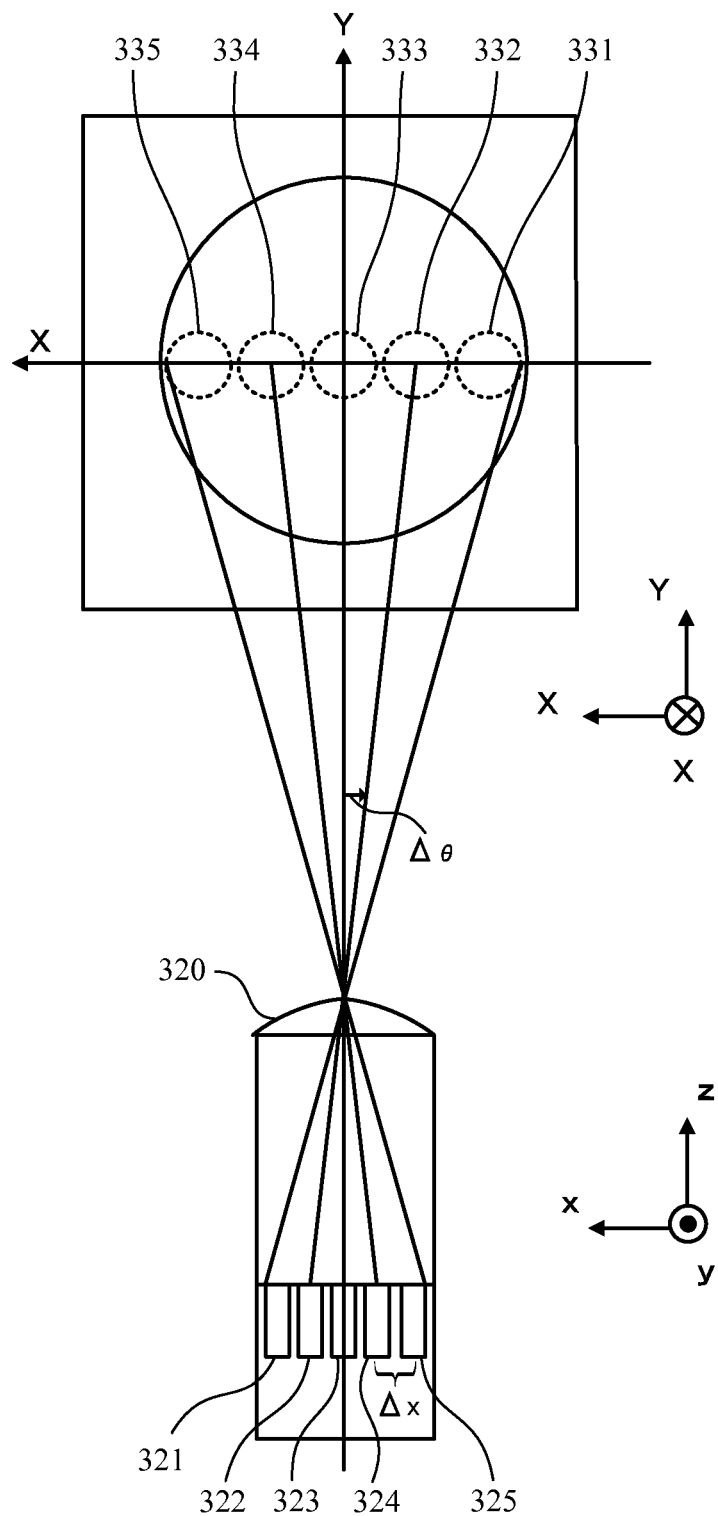

Subsequently, FIGS. 3A to 3C are diagrams for describing the features of the photographing optical system in the present embodiment. In the diagrams, substantially the same component elements as those in FIG. 1 are denoted by the same reference numerals. In order to apply the invention, it is necessary to obtain information of an angle as well as a position of rays, which information is called light field information or the like. In the embodiment, in order to obtain the angle information, the MLA is arranged near the image pickup plane of the photographing optical system 103 and a plurality of pixels are made to correspond to one of the micro lenses constructing the MLA.

FIG. 3A is a diagram conceptually illustrating a correspondence relation between the image pickup element 106 and an MLA 320. FIG. 3B is a conceptual diagram illustrating a correspondence between the pixels of the image pickup element 106 and the MLA 320. FIG. 3C is a diagram illustrating that the pixels disposed under the MLA by the MLA 320 are made to correspond to specific pupil areas.

As illustrated in FIG. 3A, the MLA 320 is arranged on the image pickup element 106 such that a front principal point of the MLA 320 is located near the focusing plane of the photographing optical system 103. FIG. 3A illustrates a side elevational view of the image pickup element 106 and a front view of the MLA 320. The lenses of the MLA 320 are arranged so as to cover the pixels on the image pickup element 106. Although each of micro lenses constructing the MLA 320 is enlargedly illustrated in FIG. 3A so as to be easily seen, actually, each micro lens has a size which is about a few times as large as the pixel. The actual size will be described by using FIG. 3B.

FIG. 3B is a partial enlarged diagram of a front view of the MLA 320 in FIG. 3A. A frame arranged in a matrix form illustrated in FIG. 3B indicates each pixel of the image pickup element 106. The micro lenses constructing the MLA 320 are shown by bold circles 320a, 320b, 320c, and 320d, respectively. As will be obvious from FIG. 3B, a plurality of pixels are allocated to one micro lens. In the example of FIG. 3B, 25 (=5 rows×5 columns) pixels form one group correspondingly to one micro lens. That is, the size of each micro lens is equal to a size of (5 times×5 times) as large as the pixel size.

FIG. 3C is a diagram illustrating a cross section regarding one micro lens in a case where the MLA is cut so that the cross section includes an optical axis of the micro lens and the longitudinal direction (X direction) of the image pickup element is parallel to the lateral direction of the diagram. Reference numerals 321, 322, 323, 324, and 325 in FIG. 3C denote pixels (one photoelectric conversion unit) of the image pickup element 106. A diagram illustrated in an upper position of FIG. 3C shows an exit pupil plane of the photographing optical system 103. Actually, although the exit pupil plane (X-Y plane) is parallel with the vertical direction (y direction) of the paper surface of FIG. 3C in accordance with correspondence of directions between the exit pupil plane and the sensor illustrated in a lower position of FIG. 3C, the projection direction is changed for description. To simplify the description of FIG. 3C, a one-dimensional projection/signal processing will now be described. That is, it is assumed that the pupil division is of one dimension of only 331 to 335 and a corresponding pixel arrangement is also set to one dimension of, for example, only 321a to 325a in FIG. 3B. This presumption is also applied to a description of FIGS. 6A to 6D. An expansion to a two-dimensional projection/signal processing in the actual apparatus can be easily performed.

There are correspondence positional relations between the pixels 321, 322, 323, 324, and 325 in FIGS. 3C and 321a, 322a, 323a, 324a, and 325a in FIG. 3B, respectively. As illustrated in FIG. 3C, each pixel is designed so as to be conjugate with a specific exit pupil area on the exit pupil plane of the photographing optical system 103 by the MLA 320. In the example of FIG. 3C, the pixel 321 and the area 331 correspond to each other, the pixel 322 and the area 332 correspond to each other, the pixel 323 and the area 333 correspond to each other, the pixel 324 and the area 334 correspond, and the pixel 325 and the area 335 correspond to each other, respectively. That is, only the light which passes through the area 331 on the exit pupil plane of the photographing optical system 103 enters the pixel 321. This is true of other pixels. As a result, information of an angle of incidence of the light can be obtained from the positional relations between the passed area on the pupil plane and the pixels on the image pickup element 106.

Notations $\Delta x$ and $\Delta \theta$ shown in FIG. 3C denote a pixel pitch and an angular resolution of the image pickup elements 106, respectively. As will be described hereinafter, together with the number of angle divisions $N_\theta$ ($N_\theta$=5 in the example of FIGS. 3A to 3C), they provide a range dmax where the contrast AF can be performed. The pixel pitch $\Delta x$ is decided by the shape of image pickup element 106. The angular resolution $\Delta \theta$ is decided by a range where an angle of light rays is obtained and the number of angle divisions $N_\theta$. Therefore, those parameters are determined only by a physical structure (structures of the image pickup element 106 and MLA 320).

Figure 7A:
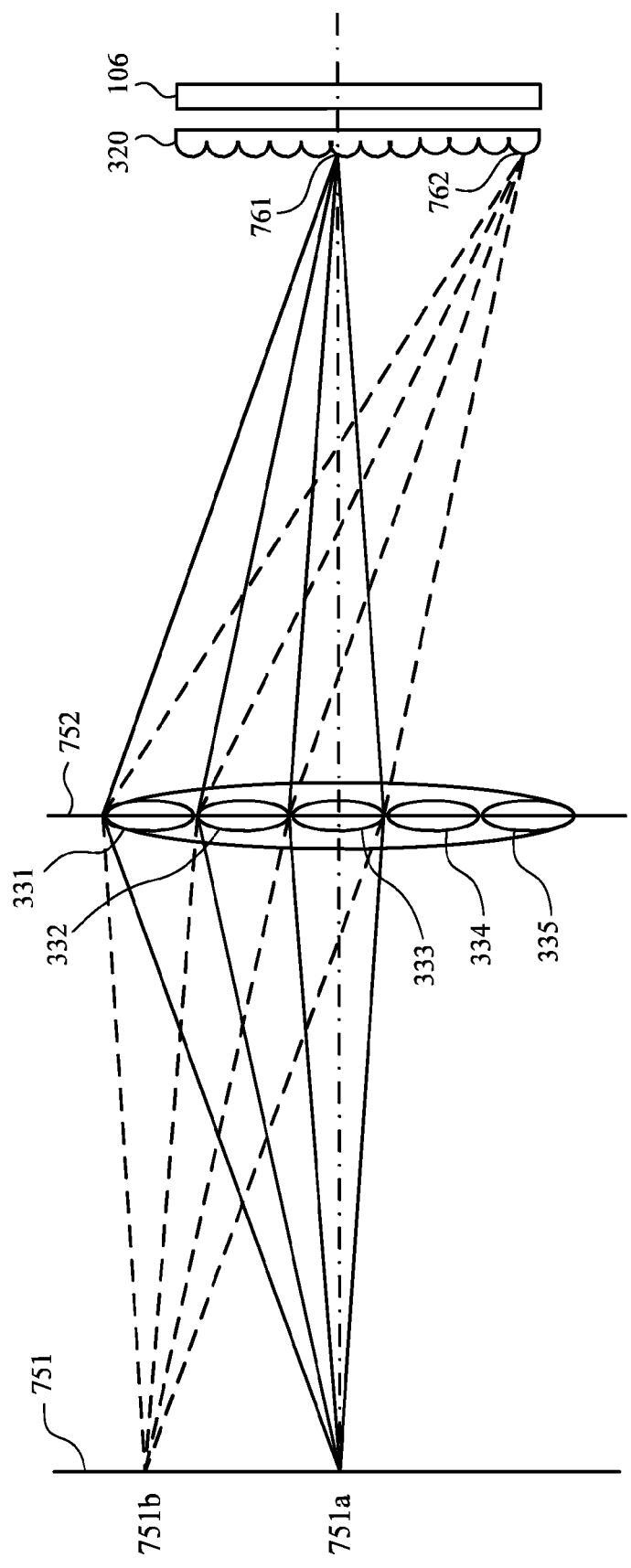
FIGS. 7A, 7B and 7C are conceptual diagrams of an optical system which can be applied to the invention.
Figure 7B:
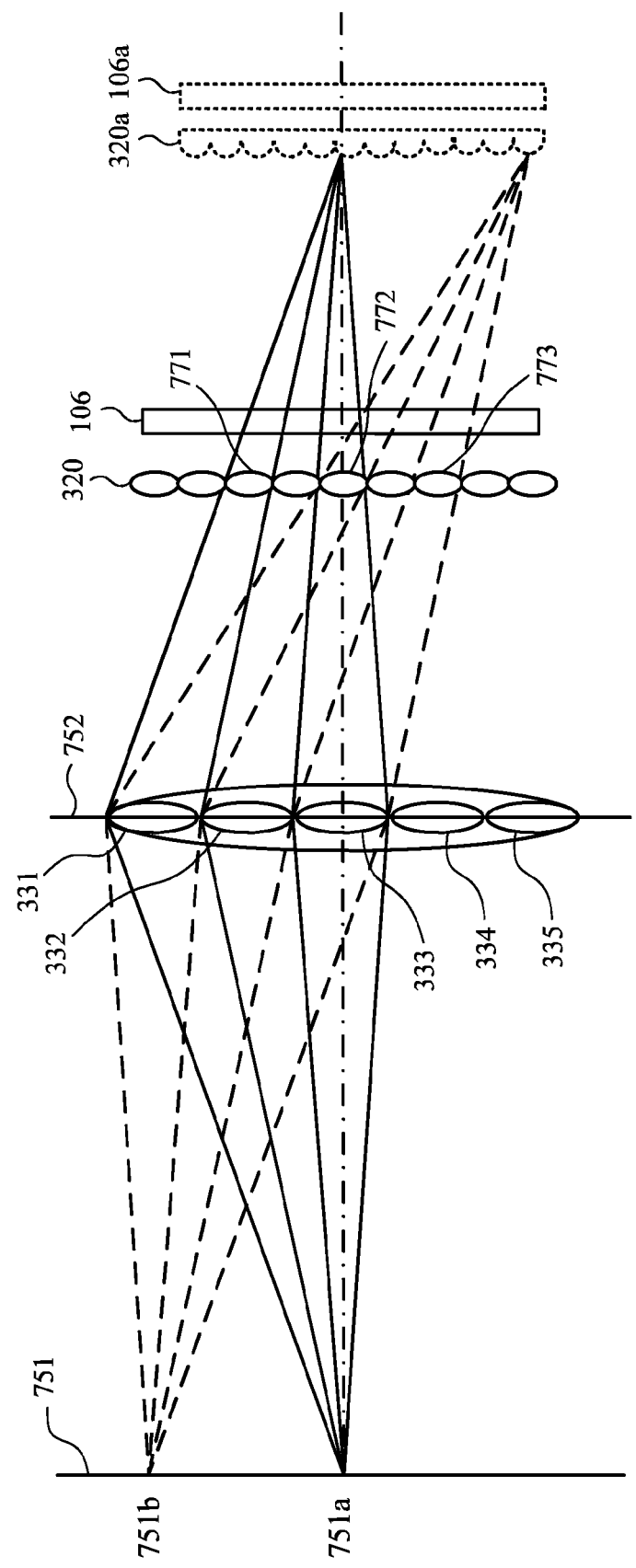
Figure 7C:
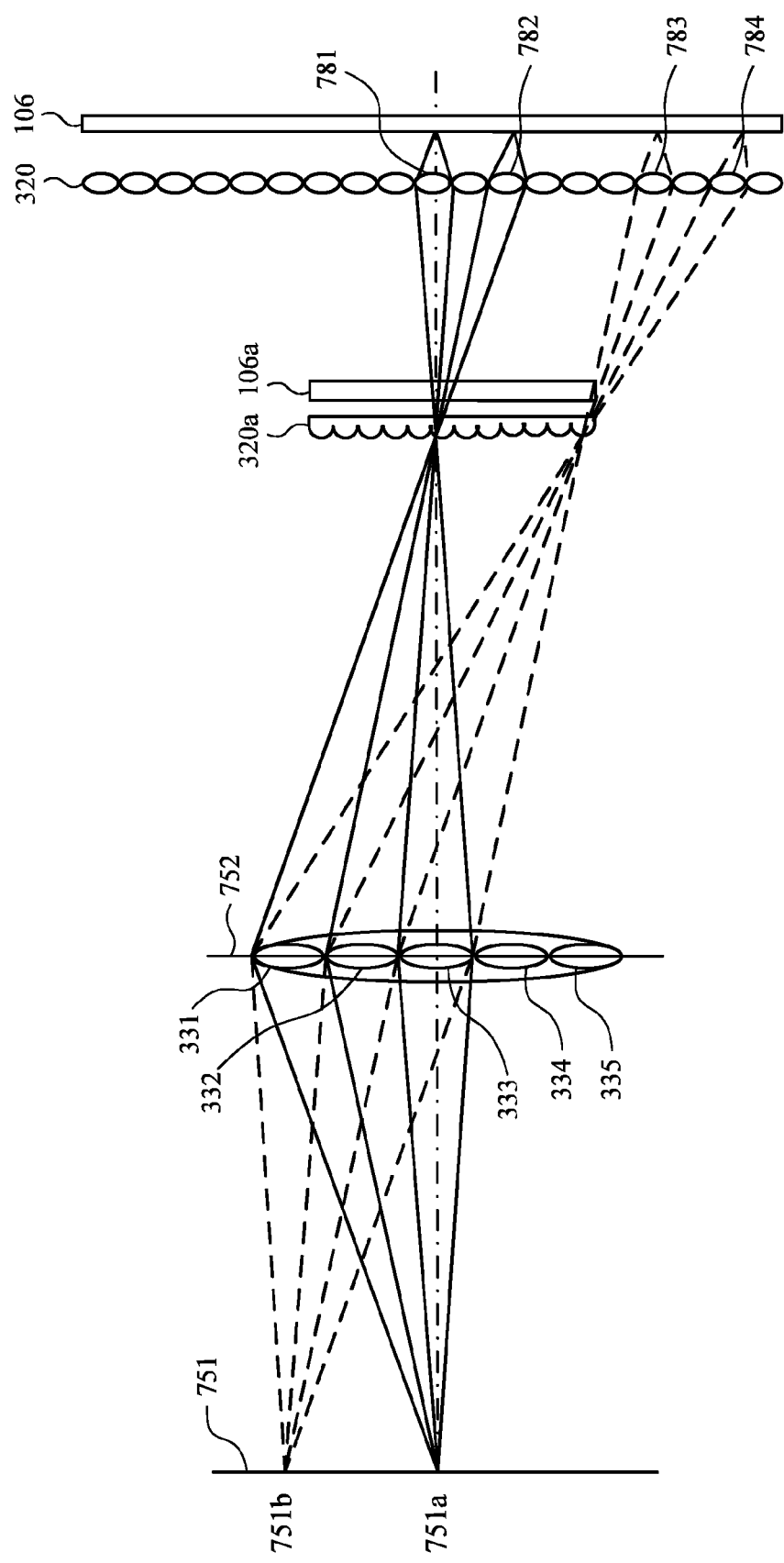

Subsequently, a re-formation of the image in a virtual focus plane in the photographing optical system in FIGS. 3A to 3C will be described by using FIGS. 7A to 7C. In the diagrams, substantially the same component elements as those in FIGS. 1 and 3A to 3C are designated by the same reference numerals. FIGS. 7A to 7C are diagrams conceptually illustrating a state where the light from the object (object to be photographed) is focused onto the image pickup element 106. FIG. 7A corresponds to the optical system described in FIGS. 3A to 3C and is an example in which the MLA 320 is arranged in the neighborhood of the image pickup plane of the photographing optical system 103. FIG. 7B is an example in which the MLA 320 is arranged near the object than the image pickup plane of the photographing optical system 103. FIG. 7C is an example in which the MLA 320 is arranged away from the object than the image pickup plane of the photographing optical system 103.

In FIGS. 7A to 7C, reference numeral 106 denotes the image pickup element; 320 the MLA; 331 to 335 the pupil areas used in FIGS. 3A to 3C; 751 an object plane; 751a and 751b proper points on the object; and 752 a pupil plane of the photographing optical system. Reference numerals 761, 762, 771, 772, 773, 781, 782, 783, and 784 denote specific micro lenses on the MLA, respectively. In FIGS. 7B and 7C, reference numeral 106a denotes an image pickup element located on a virtual focus plane and 320a indicates the MLA located on the virtual focus plane. They are illustrated as references in order to clarify the correspondence relation with FIG. 7A. The light which exits from the point 751a on the object and passes through the areas 331 and 333 on the pupil plane is shown by solid lines and the light which exits from the point 751b on the object and passes through the areas 331 and 333 on the pupil plane is shown by broken lines.

In the example of FIG. 7A, as also described in FIG. 1, by arranging the MLA 320 in the neighborhood of the image pickup plane of the photographing optical system 103, the image pickup element 106 and the pupil plane 752 of the photographing optical system have a conjugate relation. Further, the object plane 751 and the MLA 320 have a conjugate relation. Therefore, the light which exits from the point 751a on the object reaches the micro lens 761, the light which exits from the point 751b reaches the micro lens 762, and the light which passes through the areas 331 to 335 reaches the corresponding pixels provided under the micro lenses, respectively.

In the example of FIG. 7B, the light from the photographing optical system 103 is focused by the MLA 320 and the image pickup element 106 is disposed on the image pickup plane. By arranging the micro lenses as mentioned above, the object plane 751 and the image pickup element 106 have a conjugate relation. The light which exits from the point 751a on the object and passes through the area 331 on the pupil plane reaches the micro lens 771. The light which exits from the point 751a on the object and passes through the area 333 on the pupil plane reaches the micro lens 772. The light which exits from the point 751b on the object and passes through the area 331 on the pupil plane reaches the micro lens 772, the light which exits from the point 751b on the object and passes through the area 333 on the pupil plane reaches the micro lens 773. The light which passes through each micro lens reaches the corresponding pixels provided under the micro lenses, respectively. As mentioned above, the points on the object are respectively focused to a different position of the image pickup element by the passed areas on the pupil plane. By rearranging those points onto the positions on the virtual image pickup element 106a, information (re-formation of the image) similar to that in FIG. 7A can be obtained. That is, information of the passed pupil areas (angles of incidence) and the positions on the image pickup element can be obtained and the function as pupil division means is attained.

In the example of FIG. 7C, the light from the photographing optical system 103 is re-formed by the MLA 320 (since the light in a state where the light which is focused once is dispersed is focused, such a processing is called "re-formation") and the image pickup element 106 is disposed on the image pickup plane. By arranging the micro lenses as mentioned above, the object plane 751 and the image pickup element 106 have the conjugate relation. The light which exited from the point 751a on the object and passed through the area 331 on the pupil plane reaches the micro lens 782. The light which exits from the point 751a on the object and passes through the area 333 on the pupil plane reaches the micro lens 781. The light which exits from the point 751b on the object and passes through the area 331 on the pupil plane reaches the micro lens 784. The light which exits from the point 751b on the object and passes through the area 333 on the pupil plane reaches the micro lens 783. The light which passes through each micro lens reaches the corresponding pixels provided under the micro lenses, respectively. In a manner similar to FIG. 7B, by rearranging those points onto the positions on the virtual image pickup element 106a, information (re-formation of the image) similar to that in FIG. 7A can be obtained. That is, the information of the passed pupil areas (angles of incidence) and the positions on the image pickup element can be obtained and the function as pupil division means is attained.

In FIGS. 7A to 7C, the example in which the MLA (phase modulation element) is used as pupil division means and the position information and the angle information can be obtained is shown. However, another optical construction can be also used so long as it can obtain the position information and the angle information (which is equivalent to that the passed pupil areas are restricted). For instance, a method whereby a mask (gain modulation element) to which a proper pattern is formed is inserted into an optical path of the photographing optical system can be also used.

A processing for obtaining a focus evaluation value from the output signal of the image pickup element 106 by using the photographing optical system shown in the embodiment will be described by using FIGS. 4A to 4B, 5A to 5C, and 6A to 6D.

The distance measurement operation as features of the invention will be described by using FIGS. 4A to 4B and FIGS. 5A to 5C.

Figure 4A:
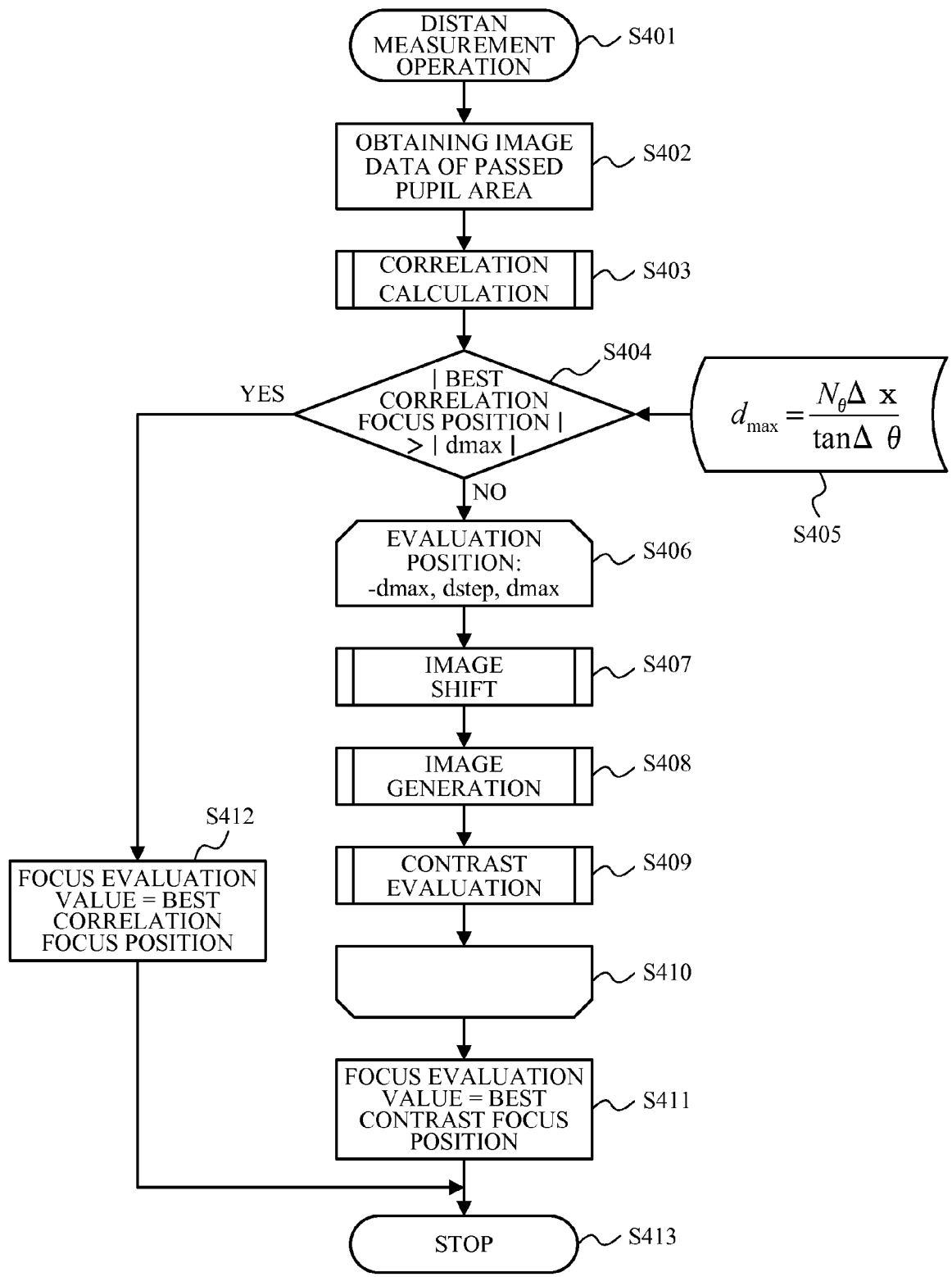
FIGS. 4A and 4B are diagrams illustrating flowcharts for AF control according to the first embodiment of the invention.
Figure 4B:
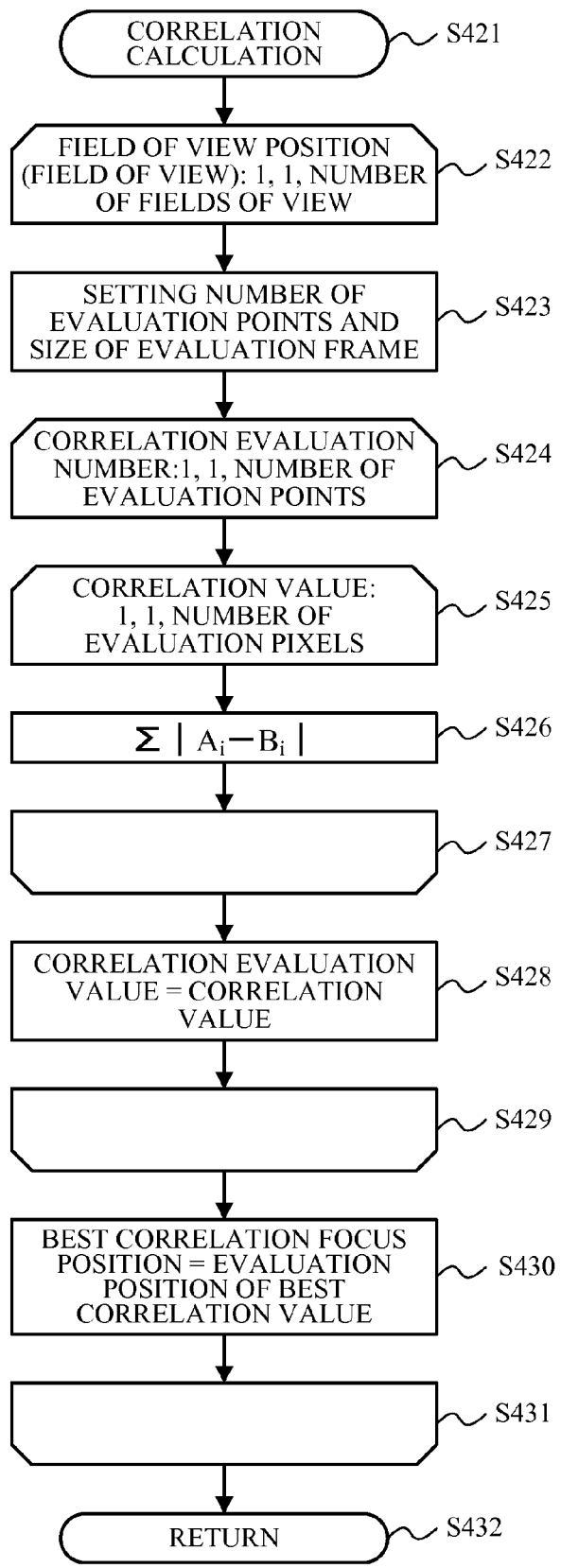
Figure 5A:
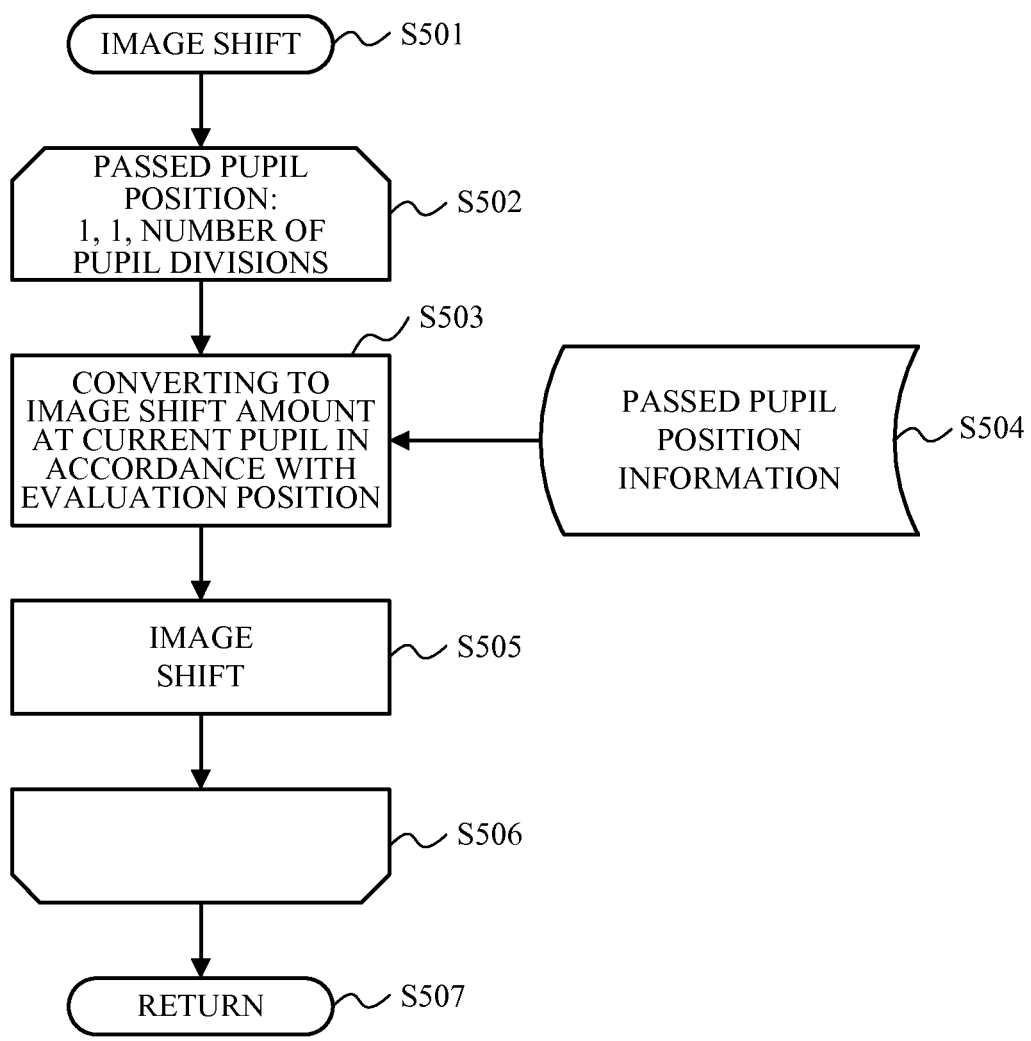
FIGS. 5A, 5B and 5C are diagrams illustrating flowcharts for AF control according to the first embodiment of the invention.
Figure 5B:
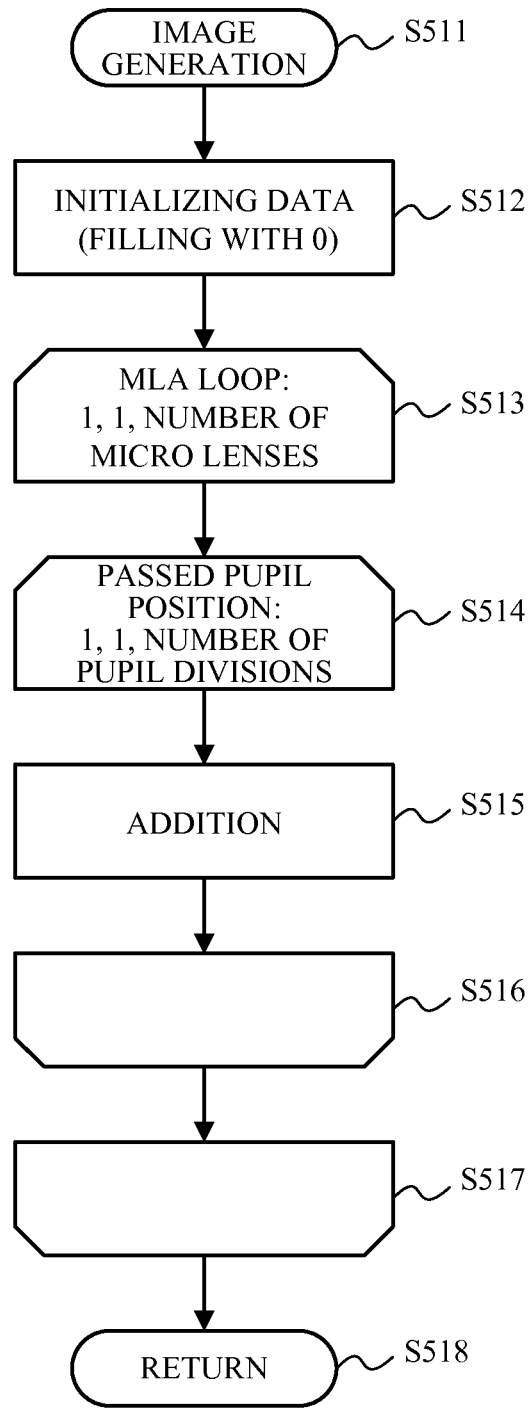
Figure 5C:
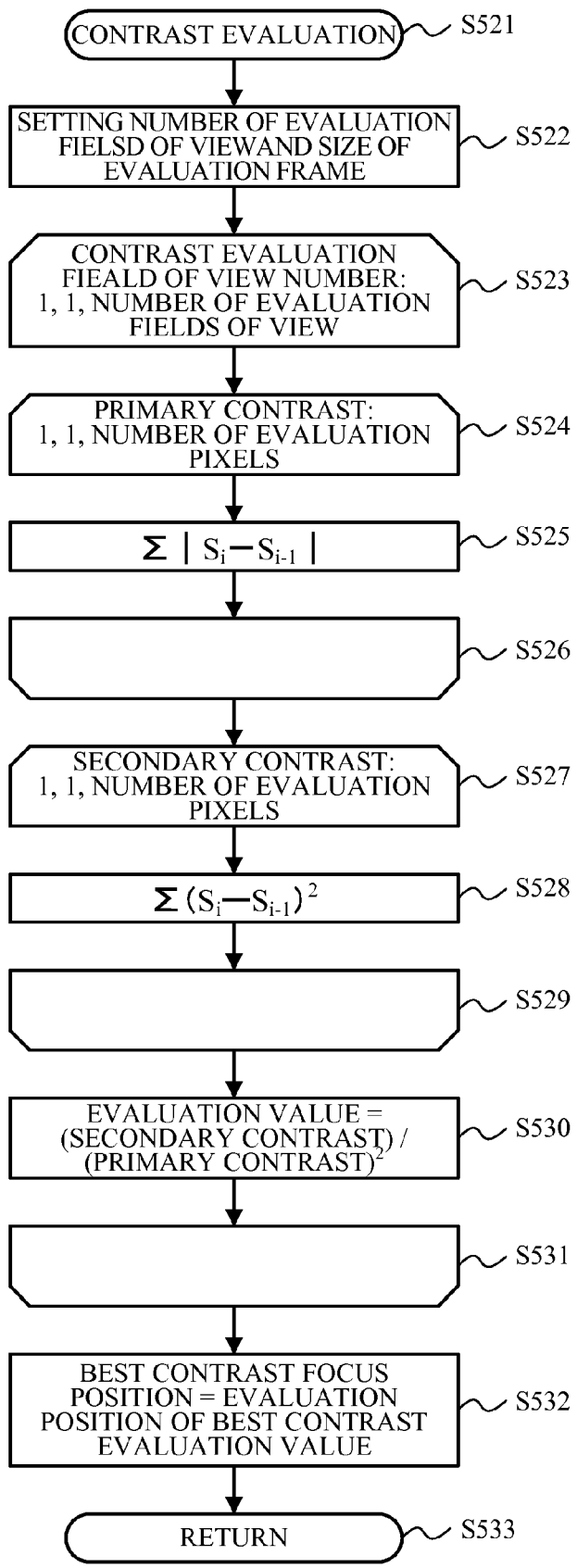

FIGS. 4A to 4B and FIGS. 5A to 5C are flowcharts for describing the distance measurement operation of the image pickup apparatus of the invention. FIG. 4A is the flowchart illustrating the whole operation of the distance measurement operation and FIG. 4B is the flowchart illustrating the operation of the correlation calculation means, respectively. FIG. 5A is the flowchart illustrating the operation of the image shift means. FIG. 5B is the flowchart illustrating the operation of the image generation means. FIG. 5C is the flowchart illustrating the operation of the contrast evaluation means. The distance measurement operation of the invention will be described in order of steps starting from FIG. 4A.

Step S401 shows the start of the distance measurement operation. For example, this is a case where in the still image photographing mode, the operation detection unit 110 illustrated in FIG. 1 detects the operation of the first stroke switch SW1 of the release button by the photographer (step S212 in FIG. 2B), or the like.

In step S402, under the control of the camera system control unit 105, the image pickup element 106 is exposed in accordance with the result of the photographing preparation operation and read out (A/D converted), thereby obtaining data (image pickup signal of the object). Although an exposure amount at the time of photographing can be also calculated from an exposure time and an exposure amount in this case, since this is not the features of the invention, description thereof is omitted.

In step S403, the camera system control unit 105 makes the correlation calculation means operative and obtains the best correlation focus position based on the correlation value. Details of the operation of the correlation calculation means will be described hereinafter by using the flowchart of FIG. 4B.

In step S404, a contrast evaluation discrimination is performed under the control of the camera system control unit 105. In step S405, the camera system control unit 105 operates as focus evaluation range decision means, which will be described hereinafter. That is, in step S404, an absolute value of the best focus position (in the diagram, expressed as "best correlation focus position") based on the correlation amount evaluation obtained in step S403 and an absolute value of a threshold value dmax which is input in step S405 are compared. When the absolute value of the best focus position based on the correlation amount evaluation is larger than the other, step S412 follows. If the absolute value of the best focus position based on the correlation amount evaluation is equal to or less than the absolute value of the threshold value dmax, step S406 follows.

The threshold value which is given from the focus evaluation range decision means in step S405 is a threshold value in the case of the focus evaluation by the contrast which is executed in steps S406 to S411 (in the case where an image shift amount can be determined) and is given by the following equation. In the virtual focus plane at the position exceeding the threshold value, there is a case where the object information is lost in the re-formation of the image described by using FIGS. 3A to 3C and FIGS. 7A to 7C, and there is a possibility that a precision of the contrast AF deteriorates.

$$d\max = N_\theta \Delta x / \tan \Delta\theta$$

As described in FIGS. 3A to 3C, $N_\theta$, $\Delta x$, and $\Delta\theta$ are determined by the physical structure of the image pickup apparatus 100 irrespective of the photographing condition or the like. Therefore, it is sufficient that previously calculated values are stored in the memory and then are read out and used in step S405.

Steps S406 to S411 form a loop processing. In step S406, the calculation is repeated up to a predetermined end value while shifting the focus evaluation position (corresponding to the virtual focus plane described by using FIGS. 7A to 7C) from a predetermined initial value by a predetermined position (step). The initial value and the end value may be determined by using dmax. In the example of FIGS. 4A and 4B, a range of −dmax to +dmax is set to the evaluation range.

In step S407, the camera system control unit 105 makes the image shift means operative, thereby obtaining the image shift amount. Details of the operation of the image shift means will be described hereinafter by using the flowchart of FIG. 5A.

In step S408, the camera system control unit 105 makes the image generation means operative, thereby performing an image generation. Details of the operation of the image generation means will be described hereinafter by using the flowchart of FIG. 5B.

In step S409, the camera system control unit 105 makes the contrast evaluation means operative, thereby obtaining the best contrast focus position based on the contrast evaluation value. Details of the operation of the contrast evaluation means will be described hereinafter by using the flowchart of FIG. 5C.

In step S411, the best focus position (in the diagram, expressed as "best contrast focus position") based on the contrast evaluation obtained in steps S406 to S410 is used as a focus evaluation value.

As a result, the reading of the image pickup element 106 is executed only once in step S402, thereby enabling the focus evaluation value including the contrast evaluation value to be obtained, and a high processing speed can be attained.

In step S412, the focus evaluation based on the contrast is omitted and the best correlation focus position based on the correlation evaluation is used as a focus evaluation value.

The correlation calculation means will be described by using the flowchart of FIG. 4B. Step S421 indicates the start of the operation of the correlation calculation means.

Steps S422 to S431 are a loop processing. In step S422, an arithmetic operation is repeatedly executed correspondingly to the number of focus evaluation positions (what is called the number of distance measurement fields of view). There is such a problem that when the number of distance measurement fields of view is set to be larger, although the whole display screen can be covered thereby, it takes a time for evaluation. It is properly set by a setting of the user or the like.

In step S423, the number of evaluation points to be subjected to the evaluation and a size of evaluation frame (for example, frame using the evaluation point as a center) are set. The number of evaluation points is the number of points for obtaining the correlation value which is obtained in step S424 and is properly set in accordance with the photographing condition, a type of lens 102, and the like. The number of evaluation points also corresponds to the shift amount in the case of obtaining the correlation while shifting the image. In the image pickup apparatus 100, it corresponds to a depth of focus for a focusing search. There is such a problem that when the number of evaluation points is set to be larger, although the whole display screen can be covered thereby, it takes a time for evaluation. Therefore, it is properly set by a setting of the user or the like. On the other hand, if the evaluation frame is set to be large, even in the case of a texture in which there do not locally exist much patterns, the image can be focused. However, if the evaluation frame is too large, what is called perspective conflict in which object images locating at different distances are simultaneously evaluated occurs. The size of evaluation frame is properly set so that those problems can be solved.

Steps S424 to S429 are a loop processing. In step S424, an arithmetic operation is repeatedly executed so as to obtain the evaluation value corresponding to the evaluation point decided in step S423.

Steps S425 to S427 are a loop processing. In step S425, a correlation calculation is executed with respect to the pixels in the evaluation frame decided in step S423. As a correlation calculation, $\Sigma |A_i - B_i|$ is calculated in step S426. $A_i$ denotes a luminance of an i-th pixel corresponding to a specific passed pupil area. $B_i$ denotes a luminance of an i-th pixel corresponding to a passed pupil area different from that of $A_i$. For example, in FIGS. 3A to 3C, it is sufficient that the luminance corresponding to an array of only the pixels corresponding to the pixel 322 is set to $A_i$ and the luminance corresponding to an array of only the pixels corresponding to the pixel 324 is set to $B_i$. As for the selection of the pixel in which pupil area, it is sufficient to decide it on the basis of a length of a reference length, a vignetting situation of the pupil plane, and the like.

By setting as mentioned above, the correlation between the images corresponding to the different passed pupil areas can be calculated and the evaluation value based on what is called a phase difference AF can be obtained. In step S428, the obtained correlation value is stored as an evaluation value into the memory 108.

In the evaluation expression of $\Sigma |A_i - B_i|$ mentioned above, the portion of the small correlation value corresponds to the portion of the best focus state (correlation focus position). Although the correlation calculation is executed by the method of adding the absolute values of the differences here, the correlation calculation may be executed by another calculating method such as method of adding maximum values, method of adding minimum values, method of adding differential square values, or the like.

In step S430, a point where the best calculation evaluation value is obtained is updated as a best focus position based on the correlation amount evaluation. In the equation of step S426 mentioned above, the point where the best calculation evaluation value is obtained is a position where the correlation value is small. However, the best position may be decided by additionally using another index.

The above arithmetic operation is executed for each field of view. When the best focus position based on the correlation amount evaluation is finally obtained, step S432 follows. The processing routine is returned to step S403 in which the present routine is called.

Subsequently, the image shift means will be described by using the flowchart of FIG. 5A. Step S501 indicates the start of the operation of the image shift means.

Steps S502 to S506 are a loop processing. In step S502, a loop calculation is executed the number of times corresponding to the number of pupil division (the number of times as many as the number of pixels of the image pickup element corresponding to one micro lens). For example, since the micro lens is divided into 25 areas (two dimension) in the example illustrated in FIGS. 3A to 3C, an image shift amount corresponding to a pupil position of each of the 25 areas is calculated. As will be described hereinafter by using FIGS. 6A to 6D, even on the same re-formation plane in the re-formation of the image, if the angle of incidence is different, then a shift amount of the image differs. This loop processing is performed to reflect such a fact to the image generation.

In step S503, a shift amount in each pupil area corresponding to the evaluation position is calculated on the basis of the data from step S504. In step S504, the correspondence relation between each pixel and the MLA has been stored and information from which it can be known that light from which pupil area each pixel receives is stored.

In step S505, the pixels receiving light of the same angle of incidence (receiving rays from the same pupil area) are shifted on the basis of the information in step S503. For example, 325a and 325b in FIG. 3B correspond to the pixels receiving the light of the same angle of incidence. Such pixels exist as many as the number of micro lenses constructing the MLA.

In step S507, the processing routine is returned to step S407 in which the present processing routine is called.

Details of the operation of the image generation means will be described by using the flowchart of FIG. 5B. Step S551 indicates the start of the operation of the image generation means.

In step S512, data in an area for addition in step S515 is initialized (filled with 0). It is sufficient that the size of data area in this instance is equal to the size corresponding to the number of the micro lenses, and it is convenient if a gradation of the data is only that which can store the product of a gradation of the original data and the number of pupil division. For example, assuming that the original data is 8-bit data and the number of pupil division is equal to 25, there is no need to consider an overflow of the data in an arithmetic operation processing in the case of 13 bits (>8 bits+$\log_2 25$).

Steps S513 to S517 are a loop processing. In step S513, a loop calculation is executed in accordance with the number of micro lenses constructing the MLA (that is, with respect to each micro lens). For example, in the example illustrated in FIGS. 3A to 3C, a value of [(the number of pixels of the original image pickup element)÷25 (the number of pupil division)] is equal to the number of micro lenses.

Steps S514 to S516 are a loop processing. In step S514, a loop calculation is executed in accordance with the number of pupil division. For example, in the example illustrated in FIGS. 3A to 3C, since the micro lens is divided into 25 (=5×5) areas, light from the pupil position of each of the 25 areas is added in step S515. When the shift amount is not integer times as long as the pixel, in the addition step S515, the light is properly divided to be added. For example, the light is properly added in accordance with an overlapping area. Thus, an image focused at each evaluation position is re-formed. Image data of the generated image is stored into the memory unit 108 or another storage means (not shown) by control of the camera system control unit 105. Therefore, the generated image can be re-formed and displayed.

In step S518, the processing routine is returned to step S408 in which this routine is called.

Details of the operation of the contrast evaluation means will be described by using the flowchart of FIG. 5C. Step S521 indicates the start of the operation of the contrast evaluation means.

In step S522, the number of evaluation fields of view and a size of evaluation frame which are subjected to the contrast evaluation are set. It is sufficient that the setting of the number of evaluation fields of view and the size is performed in accordance with the contents described in the correlation calculation means.

Steps S523 to S531 are a loop processing. In step S523, an arithmetic operation is repeatedly executed so as to obtain the evaluation value corresponding to the number of evaluation fields of view decided in step S522.

Steps S524 to S526 are a loop processing. In step S524, a primary contrast arithmetic operation is executed with respect to the pixels in each evaluation frame decided in step S522. As shown in step S525, as a primary contrast arithmetic operation, $\Sigma|S_i - S_{i-1}|$ is calculated. $S_i$ denotes a luminance which is output from the i-th image generation means. By calculating as mentioned above, a luminance difference between the adjacent pixels can be integrated. However, in the description of this step, an expression corresponding to the case where the images are one-dimensionally arranged is shown in order to clarify the description. In the two-dimensional images, luminance differences in both of the vertical and lateral directions may be integrated or only the luminance difference in one direction may be properly integrated.

Steps S527 to S529 are a loop processing. In step S527, a secondary contrast arithmetic operation is executed with respect to the pixels in each evaluation frame decided in step S522. As shown in step S528, as a secondary contrast arithmetic operation, $\Sigma(S_i - S_{i-1})^2$ is calculated. Also in the description of this step, an expression corresponding to the case where the images are one-dimensionally arranged is shown in order to clarify the description.

In the case of photographing an object (for example, sky or the like) whose luminance changes gently, the primary contrast does not change remarkably. On the other hand, the secondary contrast changes largely in accordance with the focus point. (An influence of a high frequency component is stronger.)

In step S630, therefore, a value obtained by dividing the secondary contrast by the square of the primary contrast is set as a contrast evaluation value. By processing as mentioned above, the contrast evaluation value is normalized for the luminance and the contrast evaluation value of the object according to the focus point can be obtained.

Although the contrast evaluation value is obtained by the method as mentioned above in the present embodiment, another calculating method can be also used so long as a contrast evaluation value accompanied with a focus fluctuation is obtained.

In step S532, a point (contrast focus position) where the best contrast evaluation value is obtained is updated as a best focus point based on the contrast evaluation.

In step S533, the processing routine is returned to step S409 in which the present processing routine is called.

Subsequently, the image shift and the image generation are schematically illustrated by using FIGS. 6A to 6D and a validity of the contrast calculation by the image re-formation will be described.

Figure 6A:
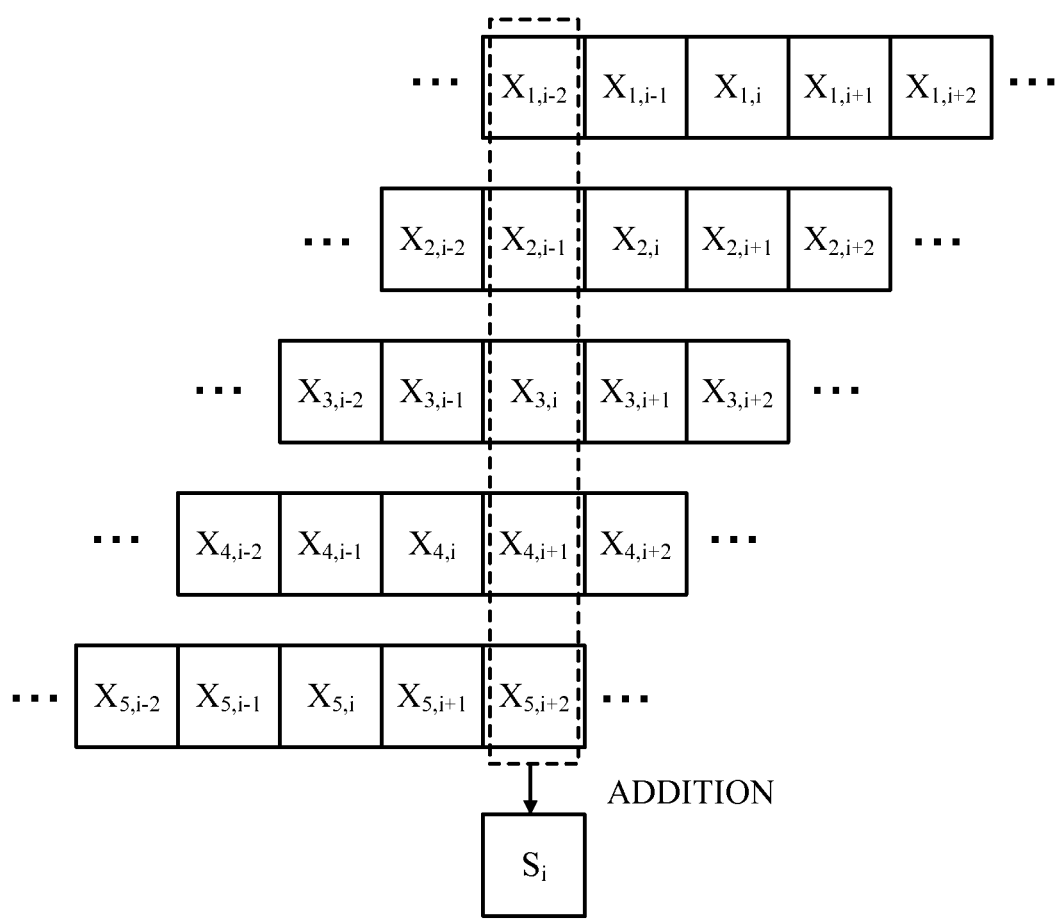
FIGS. 6A, 6B, 6C and 6D are conceptual diagrams illustrating the re-formation operation of an image.
Figure 6B:
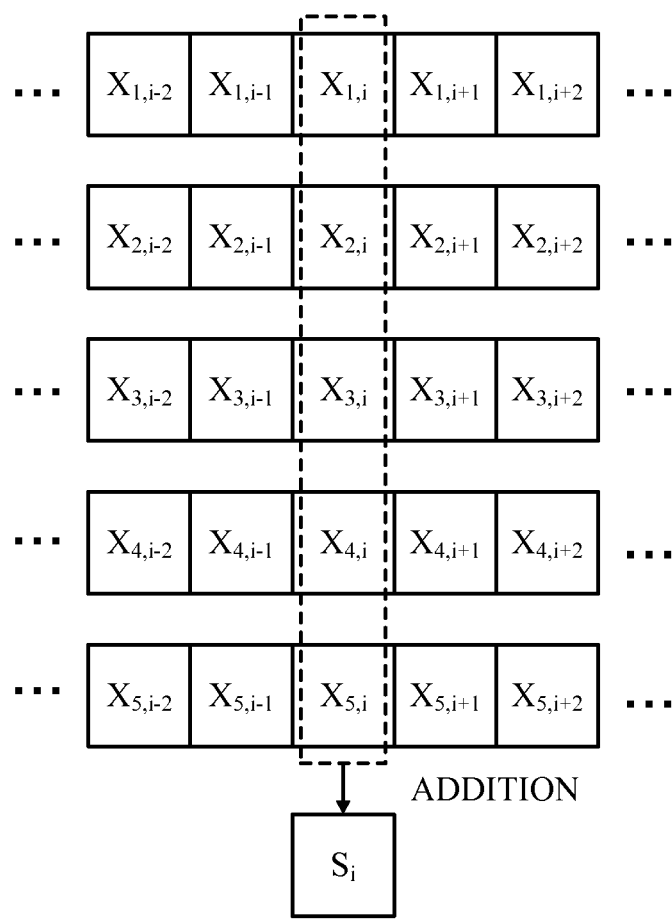
Figure 6C:
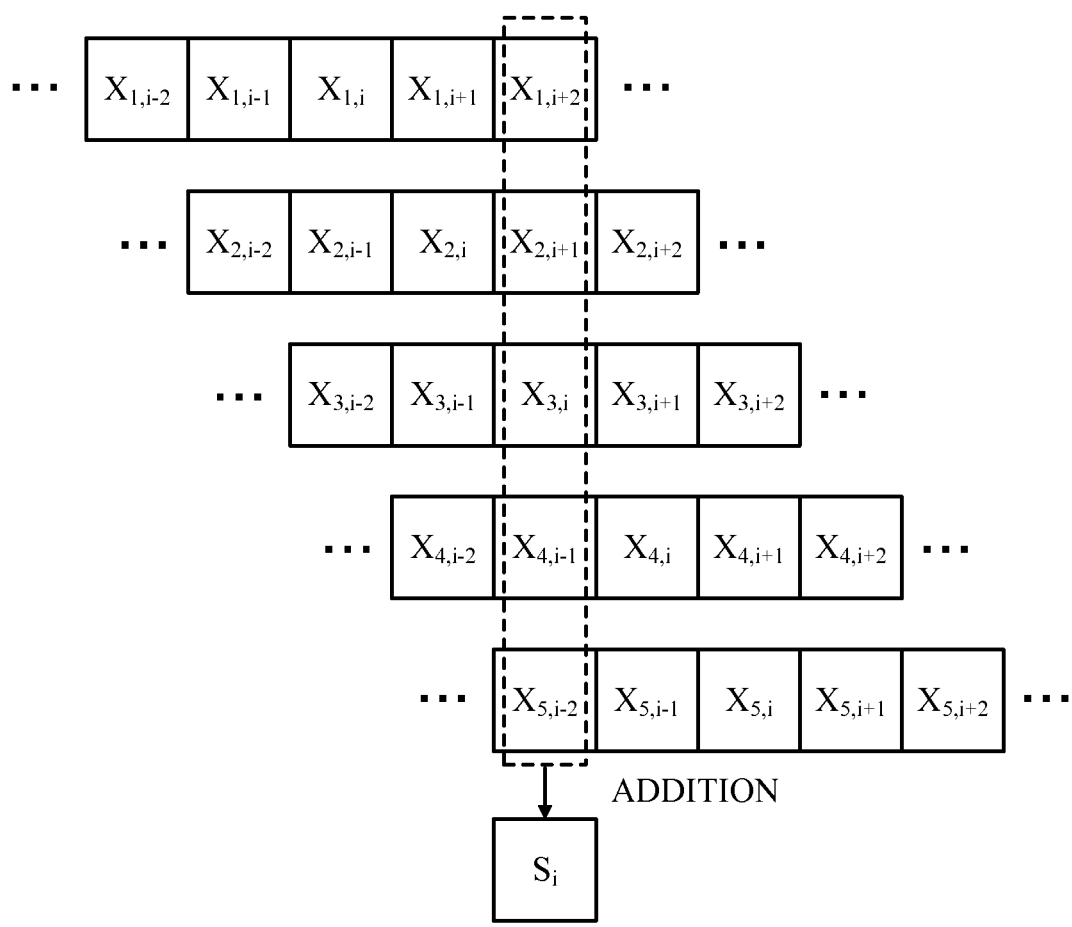
Figure 6D:
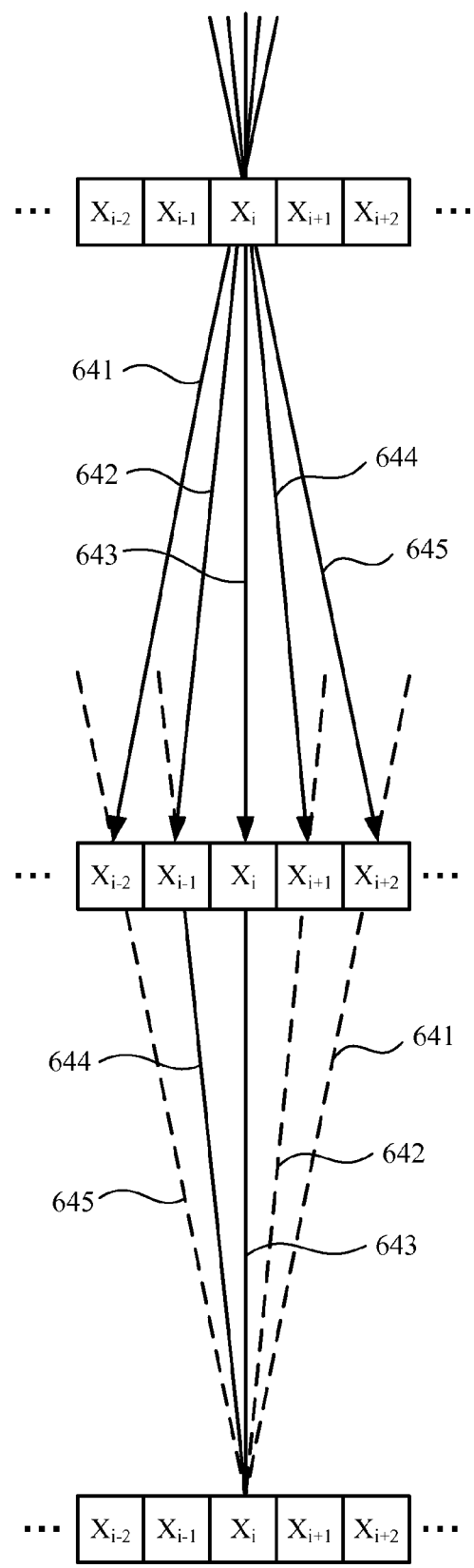

In FIGS. 6A to 6D, FIG. 6B illustrates a plane where the image pickup element 106 exists actually and the image is obtained. FIG. 6A illustrates a re-formation plane (re-formation plane 1) on the object side than FIG. 6B. FIG. 6C illustrates a re-formation plane (re-formation plane 2) on the remote side from the object side than FIG. 6B. As mentioned above, in the diagrams, in order to clarify the description, the pupil division direction and the pixel arrangement are set to one dimension, respectively.

In FIG. 6B, $X_{1,i}, X_{2,i}, X_{3,i}, X_{4,i}$, and $X_{5,i}$ denote data (image data) obtained after the light passes through the pupil areas 1, 2, 3, 4, and 5 and entered a micro lens $X_i$, respectively. That is, the former half of a subscript indicates the passed pupil area and the latter half indicates the number of the micro lens. In the relation with a physical position, $X_{1,i}$ indicates the data obtained from the area 321 in FIGS. 3C and $X_{2,i}$ indicates the data obtained from the area 322 in FIG. 3C. Numerals 3, 4, and 5 of the subscripts indicate that the data corresponds to the areas 323, 324, and 325, respectively.

To generate the image on the obtaining plane, it is sufficient to add the data (luminance) obtained after the light enters the micro lens $X_i$. Specifically speaking, an integration value in the angle direction of the light which enters the micro lens $X_i$ can be obtained by $S_i = X_{1,i} + X_{2,i} + X_{3,i} + X_{4,i} + X_{5,i}$. By executing the above processing with respect to all of the micro lenses, an image similar to that of a normal camera is generated.

Subsequently, a generation method of the image on the re-formation plane 1 will be considered. As described in FIGS. 3A to 3C, in the photographing optical system in the present embodiment, since the light which enters each pixel is limited to a specific pupil area, the angle of incidence is already known. The position of each pixel on the re-formation plane is re-formed along such an angle. Specifically speaking, in the case of the data such as $X_{1,i}$ in which the subscript of the pupil area is equal to 1, it is assumed that the light enters at an angle shown at 641 in FIG. 6D. Numerals 2, 3, 4, and 5 of the subscripts of the pupil areas indicate that the data corresponds to angles 642, 643, 644, and 645, respectively. In this case, the light which enters the micro lens $X_i$ on the re-formation plane 1 enters dispersedly to $X_{i-2}$ to $X_{1+2}$ (one dimension) at the obtaining plane. More specifically speaking, the light is dispersed to $X_{1,i-2}, X_{2,i-1}, X_{3,i}, X_{4,i+1}, X_{5,i+2}$. In order to reconstruct the image on the re-formation plane 1 without limiting to $X_i$, it can be also understood that it is required to re-form an image at the re-formation plane 1 only to shift and add the image in accordance with the angle of incidence. To generate an image on the re-formation plane 1, the data in which the subscript of the pupil area is equal to 1 is shifted to the right by two pixels, the data in which the subscript of the pupil area is equal to 2 is shifted to the right by one pixel, and the data in which the subscript of the pupil area is equal to 3 is not shifted. The data in which the subscript of the pupil area is equal to 4 is shifted to the left by one pixel and the data in which the subscript of the pupil area is equal to 5 is shifted to the left by two pixels. Thus, the shift according to the angle of incidence can be applied. After that, the data at the re-formation plane 1 can be obtained by the addition in the vertical direction illustrated in FIG. 6A. Specifically speaking, an integration value in the angle direction of the light which enters the micro lens $X_i$ at the re-formation plane 1 can be obtained by $S_i = X_{1,i-2} + X_{2,i-1} + X_{3,i} + X_{4,i+1} + X_{5,i+2}$. Thus, an image at the re-formation plane can be obtained.

Now, assuming that there is a bright point in $X_i$ at the re-formation plane 1, the light is dispersed to $X_{1,i-1}, X_{2,i-1}, X_{3,i}, X_{4,i+1},$ and $X_{5,i-2}$ and is in what is called a blurring state on the obtaining plane. However, by generating an image at the re-formation plane 1 mentioned above, a bright point is again formed in $X_i$ and an image of a high contrast is obtained. That is, by re-forming the image and calculating the contrast, what is called a contrast AF can be performed.

As will be understood from FIG. 6C, even at a re-formation plane 2, an image can be generated by a method substantially similar to that at the re-formation plane. If an arranging direction of the re-formation plane is different (this means that the direction is on the side opposite to the object), it is sufficient to merely reverse the shift direction.

As described above, according to the embodiments, the image pickup apparatus in which the phase difference AF and the contrast AF are selectively used in accordance with the image pickup position which is decided in accordance with the structure of the image pickup apparatus and the high AF precision can be maintained can be provided. Moreover, in the image pickup apparatus of the invention, only the phase difference AF is executed at the image pickup position where the precision of the contrast AF is not guaranteed. As a result, the image pickup apparatus in which the AF of the high speed and high focusing precision can be performed can be provided. Since it is sufficient that the image pickup operation (storage and read-out of the image pickup element) necessary to obtain the light information for AF is executed only once, the higher speed of the in-focus control operation can be attained.

In the foregoing embodiments, the functions of the processings illustrated in FIGS. 2A to 2C and FIGS. 4A to 5C are realized by a method whereby a CPU of the control system reads out a program for realizing the functions of the processings from the memory and executes it.

The invention is not limited to the foregoing construction but all or a part of the processings illustrated in FIGS. 2A to 2C and FIGS. 4A to 5C may be realized by dedicated hardware. As a memory mentioned above, a magnetooptic disk apparatus, a non-volatile memory such as a flash memory or the like, a read only recording medium such as a CD-ROM or the like, or a volatile memory other than a RAM can be used. The memory may be constructed by a computer-readable and writable recording medium by a combination thereof.

It is also possible to construct in such a manner that the program for realizing the functions of the processings illustrated in FIGS. 2A to 2C and FIGS. 4A to 5C is recorded into the computer-readable recording medium, the program recorded in the recording medium is read out and stored into a computer system and executed, thereby executing the processings. It is now assumed that "computer system" mentioned here incorporates hardware such as OS, peripheral devices, and the like. Specifically speaking, there is a case where the program read out of a storage medium was written into a memory provided for a function expanding board inserted into a computer or a function expanding unit connected to the computer. The invention also incorporates a case where a CPU or the like provided for the function expanding board or function expanding unit executes a part or all of actual processings on the basis of instructions of the program and the functions of the embodiments mentioned above are realized by those processings.

OTHER EXAMPLES

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer or a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadcast interpolation so as to encompass all such modifications and equivalent structures and functions.

This application claims the benefit of Japanese Patent Application No. 2011-162093, filed Jul. 25, 2011, which is hereby incorporated by reference herein in its entirety.

The invention claimed is:

1. An image pickup apparatus including a photographing optical system containing a photographing lens and an image pickup element for photoelectrically converting an optical image of an object which enters through the photographing lens and outputting an image signal, comprising:
   a pupil division unit configured to restrict light of the optical image of the object which enters each pixel of the image pickup element, to light from a specific exit pupil area of the photographing lens;
   an image shift unit configured to decide a shift amount of the image signal corresponding to a predetermined focus evaluation position for every exit pupil area on the basis of a correspondence relation between each pixel of the image pickup element and the specific exit pupil area of the photographing lens, wherein the relation is restricted by the pupil division unit;
   an image generation unit configured to generate an image corresponding to the focus evaluation position by executing an arithmetic operation processing based on the shift amount decided by the image shift unit to the image signal;
   a contrast evaluation unit configured to calculate an evaluation value of a contrast of the image generated by the image generation unit and decide a contrast focus position on the basis of the contrast evaluation value;
   a correlation calculation unit configured to calculate an evaluation value of a correlation between images corresponding to different exit pupil areas in the generated image and decide a correlation focus position on the basis of the correlation evaluation value;
   a focus evaluation range decision unit configured to decide a range of the focus evaluation position where the image shift unit can decide the shift amount, on the basis of a structure of the image pickup element and the pupil division unit; and
   a focus evaluation unit configured to compare an absolute value of the range decided by the focus evaluation range decision unit and an absolute value of the correlation focus position decided by the correlation calculation unit,
   wherein the focus evaluation unit is configured to decide a focus evaluation value of the object on the basis of the decided correlation focus position and the decided contrast focus position decided in accordance with a result of the comparison.

2. An image pickup apparatus according to claim 1, wherein the focus evaluation unit is arranged such that in accordance with the result of the comparison, when the absolute value of the correlation focus position decided by the correlation calculation unit is larger than the absolute value of the range decided by the focus evaluation range decision unit, the decision by the contrast evaluation unit is omitted and the focus evaluation position of the object is decided on the basis of the correlation focus position decided by the correlation calculation unit, and when the absolute value of the correlation focus position decided by the correlation calculation unit is equal to or less than the absolute value of the range decided by the focus evaluation range decision unit, the focus evaluation position of the object is decided on the basis of the contrast focus position decided by the contrast evaluation unit.

3. An image pickup apparatus according to claim 1, wherein the focus evaluation range decision unit decides the range of the focus evaluation position on the basis of a pixel pitch of the image pickup element and an angular resolution and the number of angle divisions of the pupil division unit.

4. An image pickup apparatus according to claim 1, wherein the image pickup apparatus has a photographing mode for photographing the object in accordance with the focus evaluation position decided by the focus evaluation unit, and wherein the photographing mode has a still image photographing mode and a moving image photographing mode, and in the moving image photographing mode, the decision of the focus evaluation position by the focus evaluation unit is performed every predetermined time.

5. An image pickup apparatus according to claim 1, wherein the pupil division unit is a micro lens array arranged on a photosensing surface of the image pickup element, and wherein in the micro lens array, a plurality of pixels formed on the photosensing surface of the image pickup element are divided into a plurality of pixel groups correspondingly to each micro lens, and the micro lens makes the pixels of the corresponding pixel group correspond to the light from the different exit pupil areas of the photographing lens.

6. An image pickup apparatus according to claim 1, wherein the correlation calculation unit calculates a difference between selected image data corresponding to the different exit pupil areas among image data of the generated image, thereby calculating a phase difference between the images which pass through the different exit pupil areas.

7. An image pickup apparatus according to claim 1, further comprising a storage unit configured to store the image generated by the image generation unit and a display unit for displaying the image stored in the storage unit.

8. A control method of an image pickup apparatus including a photographing optical system containing a photographing lens and an image pickup element for photoelectrically converting an optical image of an object which enters through the photographing lens and outputting an image signal, comprising:
   an image pickup step of restricting light of the optical image of the object which enters each pixel of the image pickup element, to light from a specific exit pupil area of the photographing lens by a pupil division unit and obtaining the image signal;
   an image shift step of deciding a shift amount of the image signal corresponding to a predetermined focus evaluation position for every exit pupil area on the basis of a correspondence relation between each pixel of the image pickup element and the specific exit pupil area of the photographing lens, wherein the relation is restricted by the pupil division unit;
   an image generation step of generating an image corresponding to the focus evaluation position by executing an arithmetic operation processing based on the shift amount decided by the image shift step to the image signal;
   a contrast evaluation step of calculating an evaluation value of a contrast of the image generated by the image generation step and deciding a contrast focus position on the basis of the contrast evaluation value;
   a correlation calculation step of calculating an evaluation value of a correlation between images corresponding to different exit pupil areas in the generated image and deciding a correlation focus position on the basis of the correlation evaluation value;
   a focus evaluation range decision step of deciding a range of the focus evaluation position where the shift amount can be decided in the image shift step, on the basis of a structure of the image pickup element and the pupil division unit; and
   a focus evaluation step of comparing an absolute value of the range decided by the focus evaluation range decision step and an absolute value of the correlation focus position decided by the correlation calculation step and deciding a focus evaluation value of the object on the basis of the decided correlation focus position and the decided contrast focus position decided in accordance with a result of the comparison.

9. A non-transitory computer-readable recording medium storing a program for a control method of an image pickup apparatus including a photographing optical system containing a photographing lens and an image pickup element for photoelectrically converting an optical image of an object which enters through the photographing lens and outputting an image signal, wherein the program causes a computer to function as:

a unit for obtaining an image signal by receiving the optical image of the object by the image pickup element by using a pupil division unit provided for restricting light of the optical image of the object which enters each pixel of the image pickup element to light from a specific exit pupil area of the photographing lens;

the pupil division unit for restricting the light of the optical image of the object which enters each pixel of the image pickup element, to the light from the specific exit pupil area of the photographing lens;

an image shift unit for deciding a shift amount of the image signal corresponding to a predetermined focus evaluation position for every exit pupil area on the basis of a correspondence relation between each pixel of the image pickup element and the specific exit pupil area of the photographing lens, wherein the relation is restricted by the pupil division unit;

an image generation unit for generating an image corresponding to the focus evaluation position by executing an arithmetic operation processing based on the shift amount decided by the image shift unit to the image signal;

a contrast evaluation unit for calculating an evaluation value of a contrast of the image generated by the image generation unit and deciding a contrast focus position on the basis of the contrast evaluation value;

a correlation calculation unit for calculating an evaluation value of a correlation between images corresponding to different exit pupil areas in the generated image and deciding a correlation focus position on the basis of the correlation evaluation value;

a focus evaluation range decision unit for deciding a range of the focus evaluation position where the image shift unit can decide the shift amount, on the basis of a structure of the image pickup element and the pupil division unit; and a focus evaluation unit for comparing an absolute value of the range decided by the focus evaluation range decision unit and an absolute value of the correlation focus position decided by the correlation calculation unit, wherein the focus evaluation unit decides a focus evaluation value of the object on the basis of the decided correlation focus position and the decided contrast focus position decided in accordance with a result of the comparison.

* * * * *